US012660011B2

(12) United States Patent
Mao

(10) Patent No.: US 12,660,011 B2
(45) Date of Patent: Jun. 16, 2026

(54) NETWORKING METHOD, NETWORKING SYSTEM, AND ELECTRONIC DEVICE

(71) Applicant: Huawei Technologies Co., Ltd., Shenzhen (CN)

(72) Inventor: Yufeng Mao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 690 days.

(21) Appl. No.: 18/163,685

(22) Filed: Feb. 2, 2023

(65) Prior Publication Data

US 2023/0269791 A1 Aug. 24, 2023

Related U.S. Application Data

(63) Continuation of application No. PCT/CN2021/109008, filed on Jul. 28, 2021.

(30) Foreign Application Priority Data

Aug. 3, 2020 (CN) .......................... 202010767022.6

(51) Int. Cl.
*H04W 48/18* (2009.01)
*H04W 36/30* (2009.01)
*H04W 76/10* (2018.01)

(52) U.S. Cl.
CPC ......... *H04W 76/10* (2018.02); *H04W 36/302* (2023.05)

(58) Field of Classification Search
CPC ... H04W 76/10; H04W 36/302; H04W 48/18; H04W 76/14; H04W 88/04; H04W 88/06; H04W 92/18; H04W 4/80; Y02D 30/70
See application file for complete search history.

(56) References Cited

U.S. PATENT DOCUMENTS 8,094,597 B1 * 1/2012 Chhabra ................. H04W 4/80
370/311
2015/0063339 A1 3/2015 Han et al.
2015/0105121 A1 * 4/2015 Emmanuel .......... H04W 74/002
455/553.1

FOREIGN PATENT DOCUMENTS

CN 103428283 A 12/2013
CN 106572498 A 4/2017
(Continued)

OTHER PUBLICATIONS

IEEE Standard for Information technology, Telecommunications and information exchange between systems, Local and metropolitan area networks, Specific requirements, Part 11: Wireless LAN Medium Access Control (MAC) and Physical Layer (PHY) Specifications, Amendment 9: Interworking with External Networks, IEEE Std 802.11u-2011, Feb. 25, 2011, 208 pages.

*Primary Examiner* — Joseph E Dean, Jr.
(74) *Attorney, Agent, or Firm* — Conley Rose, P.C.

(57) ABSTRACT

A networking method includes a first electronic device that establishes a communication connection to a second electronic device, and determines at least two different types of transmission channels between the first electronic device and the second electronic device. The transmission channels include at least two of a BLUETOOTH low energy transmission channel, a BLUETOOTH transmission channel, a WI-FI direct transmission channel, a Universal Serial Bus (USB) direct transmission channel, and an Ethernet data line direct transmission channel. During networking, the first electronic device determines first network access data and a data characteristic of the first network access data, determines, based on the data characteristic, a first transmission channel used to transmit the first network access data from the at least two transmission channels, and sends the first (Continued)

network access data to the second electronic device through
the first transmission channel.

20 Claims, 13 Drawing Sheets

(56)                    References Cited

FOREIGN PATENT DOCUMENTS

| CN | 106658372 | A  | 5/2017 |
|----|-----------|----|--------|
| CN | 107801222 | A  | 3/2018 |
| CN | 111050377 | A  | 4/2020 |
| WO | 2018120389 | A1 | 7/2018 |
| WO | 2020147627 | A1 | 7/2020 |

* cited by examiner

NETWORKING METHOD, NETWORKING SYSTEM, AND ELECTRONIC DEVICE

CROSS-REFERENCE TO RELATED APPLICATIONS

This is a U.S. continuation of International Patent Application No. PCT/CN2021/109008 filed on Jul. 28, 2021, which claims priority to Chinese Patent Application No. 202010767022.6 filed on Aug. 3, 2020. The disclosures of the aforementioned applications are hereby incorporated by reference in their entireties.

TECHNICAL FIELD

This disclosure relates to the field of communication technologies, and in particular, to a networking method, a networking system, and an electronic device.

BACKGROUND

With development of electronic devices, an increasing number of mobile phones, for example, and wearable devices such as watches and glasses, and smart living products such as televisions and air conditioners are followed by increasingly diverse application scenarios and networking (or surfing) manners of the electronic devices.

Usually, an electronic device is networked to access a network by using another electronic device. For example, a watch is networked by using a mobile phone. Common manners of networking electronic devices include a wireless local area network (WLAN) (for example, a WI-FI network), WI-FI direct (or WI-FI peer-to-peer (P2P)), BLUETOOTH (BT), BLUETOOTH Low Energy (BLE), a mobile hotspot, and the like.

When electronic devices are networked, a single transmission channel is usually established based on a single type of networking manner to transmit network access data, so as to implement network access. However, due to diversity of network access data transmitted during networking, the single transmission channel usually fails to adapt to diversified network access data.

SUMMARY

This disclosure provides a networking method. A plurality of (or multiple) transmission channels of different types are supported between electronic devices. During networking, an appropriate transmission channel may be selected from the plurality of transmission channels of different types based on a data characteristic of network access data to transmit the network access data, so that when an electronic device accesses a network by using another electronic device, a transmission channel used to transmit the network access data is more adaptive to the network access data, and transmission of the network access data is more efficient or energy-saving.

To resolve the foregoing technical problem, according to a first aspect, an implementation of this disclosure provides a networking method, which is applied to a first electronic device. The method includes the following. The first electronic device establishes a communication connection to a second electronic device, and determines at least two different types of transmission channels between the first electronic device and the second electronic device, so as to adapt to diversified network access data transmitted between the first electronic device and the second electronic device.

The transmission channels include at least two of a BLUETOOTH low energy transmission channel, a BLUETOOTH transmission channel, a WI-FI direct transmission channel, a USB direct transmission channel, and an Ethernet data line direct transmission channel. During networking, the first electronic device determines to-be-transmitted first network access data, determines a data characteristic of the first network access data, determines, based on the data characteristic, a first transmission channel that is more adaptive to the first network access data and that is used to transmit the first network access data from the plurality of transmission channels of different types, and sends the first network access data to the second electronic device through the first transmission channel. For example, if a data frame of the first network access data is large, a transmission channel with a large bandwidth may be selected as the first transmission channel, so that transmission of the first network access data is more efficient. If the transmission of the first network access data consumes high energy and has a low requirement on transmission efficiency, a transmission channel with low energy consumption may be selected as the first transmission channel, so that the transmission of the first network access data is more energy-saving.

In this implementation, different types of transmission channels refer to transmission channels based on different communication manners, for example, a BLUETOOTH low energy transmission channel based on BLUETOOTH low energy communication, a BLUETOOTH transmission channel based on BLUETOOTH communication, a WI-FI direct transmission channel based on WI-FI communication, a Universal Serial Bus (USB) direct transmission channel based on USB communication, and an Ethernet data line direct transmission channel based on an Ethernet data line. The transmission channel may alternatively be another type of transmission channel.

In a possible implementation of the first aspect, the first electronic device may determine the at least two different types of transmission channels based on a transmission channel supported by the first electronic device and a transmission channel supported by the second electronic device. The transmission channel supported by the first electronic device may be determined according to whether the first electronic device has a BLUETOOTH communication module, a WI-FI communication module, and the like. A manner of determining the transmission channel supported by the second electronic device is the same as a manner of determining the transmission channel supported by the first electronic device, and details are not described herein again.

In a possible implementation of the first aspect, that the first electronic device establishes a communication connection to a second electronic device may be establishing any one of BLUETOOTH low energy communication, BLUETOOTH communication, WI-FI communication, USB communication, and Ethernet data line communication, or may be establishing another type of communication connection.

In a possible implementation of the first aspect, the first network access data is a network access request generated by the first electronic device. The first electronic device sends the first network access data to the second electronic device, the second electronic device sends the first network access data to the network, the network generates, based on the first network access data, second network access data in response to the first network access data as reply data, the network sends the second network access data to the second electronic device, and then the second electronic device sends the second network access data to the first electronic device. The second electronic device may send the second network access data to the first electronic device through the first transmission channel, or may send the second network access data through another transmission channel.

In a possible implementation of the first aspect, the first electronic device is a wearable device, and the second electronic device is a mobile phone. The wearable device may be a watch, a band, a headset, or the like. In addition, the mobile phone may be a device such as a tablet computer or a television.

In a possible implementation of the foregoing first aspect, the method further includes the following. The first network access data is data that is received by the first electronic device from a network and that is used to respond to a network access request of the second electronic device. That is, during networking, the second electronic device sends the network access request to the first electronic device, the first electronic device sends the network access request to the network, the network generates, based on the network access request, data in response to the network access request, and sends the data as the first network access data to the first electronic device, and the first electronic device sends the first network access data to the second electronic device.

In a possible implementation of the first aspect, the first electronic device is a mobile phone, and the second electronic device is a wearable device.

In a possible implementation of the first aspect, that the first electronic device determines, based on the data characteristic, a first transmission channel that is in the transmission channels and that is used to transmit the first network access data includes determining, based on a preset correspondence between the data characteristic and the transmission channel, the first transmission channel used to transmit the first network access data. After the data characteristic of the first network access data is determined, the first transmission channel used to transmit the first network access data can be conveniently determined.

In a possible implementation of the first aspect, that the first electronic device determines, based on the data characteristic, a first transmission channel that is in the transmission channels and that is used to transmit the first network access data includes determining a channel characteristic of each transmission channel, determining a channel requirement of the first network access data for the transmission channel based on the data characteristic of the first network access data, and matching the channel requirement with the channel characteristic of each transmission channel, and determining the first transmission channel used to transmit the first network access data.

In a possible implementation of the first aspect, the method further includes the following. The first electronic device quantizes the channel characteristic to obtain a corresponding first characteristic value, the first electronic device quantizes the channel requirement to obtain a corresponding second characteristic value, the first electronic device obtains an absolute value of a difference between the first characteristic value and the second characteristic value, and the first electronic device determines the first transmission channel based on the absolute value.

In a possible implementation of the first aspect, the channel requirement is matched with the channel characteristic of each transmission channel to determine a transmission channel corresponding to a smallest absolute value as the first transmission channel.

The channel characteristic and the channel requirement are respectively quantized, and each channel characteristic and each channel requirement are represented by using a number, so that a quantized comparison between a plurality of characteristics of a corresponding channel characteristic and channel requirement can be more conveniently implemented.

In a possible implementation of the first aspect, the channel characteristic includes at least one of the following: a power consumption characteristic, a bandwidth characteristic, a channel response speed characteristic, a transmission delay characteristic, and a connection reliability characteristic. The channel requirement includes at least one of the following: a power consumption requirement, a bandwidth requirement, a channel response speed requirement, a transmission delay requirement, and a connection reliability requirement. The channel characteristic and the channel requirement correspond to each other. The channel characteristic may alternatively be another characteristic, and the channel requirement may alternatively correspond to another requirement.

In a possible implementation of the first aspect, the data characteristic of the first network access data includes at least one of the following: a transmission protocol type, a data frame size, and quintuple information. The transfer protocol type may be a Domain Name System (DNS) protocol, a Hypertext Transfer Protocol (HTTP), a File Transfer Protocol (FTP), a Real-time Transfer Protocol (RTP), or another transfer protocol. The quintuple information includes a source Internet Protocol (IP) address, a source port, a destination IP address, a destination port, and a transport layer protocol.

In a possible implementation of the first aspect, determining, based on the data characteristic, a first transmission channel that is in the transmission channels and that is used to transmit the first network access data includes, if the transmission protocol type of the first network access data is a DNS protocol or an HTTP, the first transmission channel is a BLUETOOTH transmission channel, or if the transfer protocol type of the first network access data is an FTP or a RTP, the first transmission channel is a WI-FI direct transmission channel.

In a possible implementation of the first aspect, determining, based on the data characteristic, a first transmission channel that is in the transmission channels and that is used to transmit the first network access data includes, if the data frame size of the first network access data is greater than or equal to a preset data frame threshold, the first transmission channel is a WI-FI direct transmission channel, or if the data frame size of the first network access data is less than a preset data frame threshold, the first transmission channel is a BLUETOOTH transmission channel.

In a possible implementation of the first aspect, determining, based on the data characteristic, a first transmission channel that is in the transmission channels and that is used to transmit the first network access data includes determining, based on the quintuple information of the first network access data, a service type corresponding to the first network access data, and if the service type corresponding to the first network access data is a streaming media service or a DNS protocol service, the first transmission channel is the WI-FI direct transmission channel.

In a possible implementation of the first aspect, after determining a transmission channel and before determining a first transmission channel, the method further includes selecting one transmission channel from the at least two transmission channels as a default transmission channel that maintains an enabled state, if the first transmission channel determined by the first electronic device is the same as the default transmission channel, using the default transmission channel as the first transmission channel, and if the first transmission channel determined by the first electronic device is another transmission channel different from the default transmission channel, enabling the first transmission channel for transmission of the first network access data, and disabling the first transmission channel after the transmission is completed.

That the first electronic device determines a default transmission channel may be as follows. After the first electronic device establishes the communication connection to the second electronic device, using a transmission channel corresponding to the established communication connection as the default transmission channel. In addition, the first electronic device may determine the default transmission channel at any time according to a requirement in a process of networking the first electronic device.

In a possible implementation of the foregoing first aspect, the method further includes sending channel information of the determined at least two transmission channels to the second electronic device through the default transmission channel, to notify the second electronic device of a transmission channel possibly to be used in a subsequent networking process. If the first transmission channel is another transmission channel different from the default transmission channel, after determining the first transmission channel, the first electronic device sends information for enabling the first transmission channel to the second electronic device through the default transmission channel, so that the second electronic device enables the first transmission channel, and the first network access data can be transmitted between the electronic device and the second electronic device through the first transmission channel. After sending the first network access data, the first electronic device may further send, to the second electronic device through the default transmission channel, information for disabling the first transmission channel, so that the second electronic device disables the first transmission channel. In this way, the first transmission channel is in a disabled state when not used, so that power consumption of the first electronic device and the second electronic device can be effectively reduced.

In a possible implementation of the first aspect, the method further includes the following. When the first electronic device and the second electronic device are paired to establish a communication connection, the first electronic device displays a declaration and a consent control for enabling a proxy networking multi-transmission channel negotiation function, and if the first electronic device detects a trigger operation of a user on the consent control, the first electronic device determines the transmission channel, and in a process of transmitting network access data to the second electronic device, determines the first transmission channel used for the transmission of the first network access data. Certainly, the first electronic device may further display a cancel control. If the first electronic device detects a trigger operation of the user on the cancel control, the first electronic device does not determine the at least two transmission channels, and directly sends the first network access data through a transmission channel corresponding to the communication connection established to the second electronic device.

In a possible implementation of the first aspect, the first electronic device includes a proxy networking multi-transmission channel negotiation and selection control, and the method further includes the following. When the first electronic device and the second electronic device are paired to establish the communication connection, the first electronic device displays the proxy networking multi-transmission channel negotiation and selection control, and if the first electronic device detects an enabling operation of the user on the proxy networking multi-transmission channel negotiation and selection control, the first electronic device determines the transmission channel, and in the process of transmitting the network access data to the second electronic device, determines the first transmission channel used for the transmission of the first network access data. In addition, if the first electronic device detects a disabling operation performed by the user on the proxy networking multi-transmission channel negotiation selection control, the first electronic device does not determine the at least two transmission channels, or in a process of transmitting network access data between the first electronic device and the second electronic device, the first transmission channel used to transmit the first network access data is not determined, and the first network access data is directly sent through the transmission channel corresponding to the communication connection established between the first electronic device and the second electronic device.

According to a second aspect, an implementation of this disclosure provides a networking method. The method includes the following. A first electronic device establishes a communication connection to a second electronic device, the first electronic device determines at least two different types of transmission channels between the first electronic device and the second electronic device, where the transmission channels includes at least two of a BLUETOOTH low energy transmission channel, a BLUETOOTH transmission channel, a WI-FI direct transmission channel, a USB direct transmission channel, and an Ethernet data line direct transmission channel, the first electronic device generates to-be-transmitted first network access data, the first electronic device determines a data characteristic of the first network access data, and determines, based on the data characteristic, a first transmission channel that is in the transmission channels and that is used to transmit the first network access data, the first electronic device sends the first network access data to the second electronic device through the first transmission channel, the second electronic device receives the first network access data, and sends the first network access data to a network, the second electronic device receives second network access data that is sent by the network in response to the first network access data, and the second electronic device sends the second network access data to the first electronic device through the first transmission channel, or the second electronic device determines a data characteristic of the second network access data, and a second transmission channel used to transmit the second network access data based on the data characteristic, and the second electronic device sends the second network access data to the first electronic device through the second transmission channel.

In a possible implementation of the second aspect, the first network access data is a network access request generated by the first electronic device, and the second network access data is reply data that is generated by the network in response to the first network access data after the network receives the first network access data.

The networking method provided in this implementation corresponds to the networking method provided in any one of the first aspect and/or the possible implementations of the first aspect. Therefore, beneficial effects (or advantages) of the networking method provided in the first aspect can also be implemented.

According to a third aspect, an implementation of this disclosure provides a networking system, including at least a first electronic device and a second electronic device. The first electronic device establishes a communication connection to the second electronic device. The first electronic device is configured to determine at least two different types of transmission channels between the first electronic device and the second electronic device. The transmission channels include at least two of a BLUETOOTH low energy transmission channel, a BLUETOOTH transmission channel, a WI-FI direct transmission channel, a USB direct transmission channel, and an Ethernet data line direct transmission channel. The first electronic device is configured to determine to-be-transmitted first network access data. The first electronic device is configured to determine a data characteristic of the first network access data, and determine, based on the data characteristic, a first transmission channel that is in the transmission channels and that is used to transmit the first network access data. The first electronic device is configured to send the first network access data to the second electronic device through the first transmission channel. The second electronic device is configured to receive the first network access data, and send the first network access data to a network. The second electronic device is configured to receive second network access data that is sent by the network in response to the first network access data. The second electronic device is configured to send the second network access data to the first electronic device through the first transmission channel. Alternatively, the second electronic device is configured to determine a data characteristic of the second network access data, and determine a second transmission channel based on the data characteristic, and the second electronic device is configured to send the second network access data to the first electronic device through the second transmission channel.

The networking system provided in this implementation includes the first electronic device and the second electronic device that are configured to perform the networking method provided in any one of the second aspect and/or the possible implementations of the second aspect. Therefore, beneficial effects (or advantages) of the networking method provided in the second aspect can also be implemented.

According to a fourth aspect, an implementation of this disclosure provides an electronic device, including a memory configured to store a computer program that includes program instructions, and a control component configured to execute the program instructions, to enable the electronic device to perform the networking method provided in the first aspect and/or any one of the possible implementations of the first aspect.

According to a fifth aspect, an implementation of this disclosure provides a computer-readable storage medium. The computer-readable storage medium stores a computer program, the computer program includes program instructions, and the program instructions are run by an electronic device, so that the electronic device performs the networking method according to any one of the first aspect and/or the possible implementations of the first aspect.

BRIEF DESCRIPTION OF DRAWINGS

To describe the technical solutions in this disclosure more clearly, the following briefly describes the accompanying drawings for describing some of the implementations.

DESCRIPTION OF EMBODIMENTS

Figure 1:
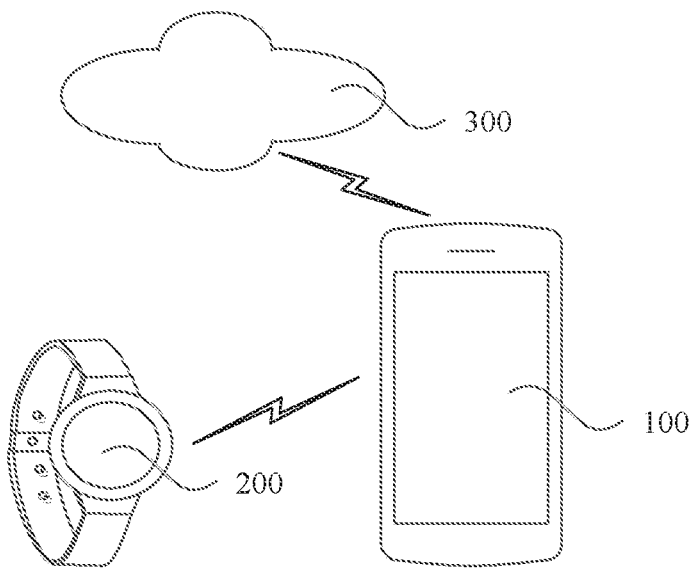
FIG. 1 is a schematic diagram of a networking system according to some implementations of this disclosure.

The following describes the implementations of embodiments of this disclosure in detail with reference to accompanying drawings.

In a use scenario of an electronic device, there is usually a case in which the electronic device is networked to access a network by using another electronic device. For example, an electronic device that does not have a networking capability or cannot be independently networked for a long time may be used as a client that requires a network access service (or a client). When the client needs to access the network, the client may be networked by using an electronic device that has a networking capability and that provides a network access service or can be independently networked for a long time as a server (referred to as a server).

It should be noted that, the client may refer to a device whose hardware does not support independent networking, for example, a device that does not support a networking capability and that is not provided with a BLUETOOTH communication module, a WI-FI communication module or the like, or the client may refer to a device whose hardware supports independent networking but cannot be independently networked only in a specific case, for example, a mobile phone that is in an environment without access to a wireless network and cannot access a cellular network due to a reason such as arrears. Alternatively, when remaining traffic is insufficient, a user may select a mobile phone that accesses the network by using traffic of another electronic device, or the like. This is not limited in this embodiment of this disclosure.

The client may be typically a wearable device such as a watch, a headset, or glasses. Due to hardware limitations such as a small size and a low battery capacity, the wearable device usually cannot be independently networked for a long time. Therefore, the wearable device usually completes network access by using a mobile device. Certainly, when hardware of the client supports independent networking, the client may alternatively be, for example, a device such as a mobile phone, a tablet computer, a television, a notebook computer, a personal computer (PC), an ultra-mobile personal computer (UMPC), a handheld computer, a netbook, a personal digital assistant (PDA), or a smart device (such as a speaker, a router, or a smart screen).

The server may be a device such as a mobile phone, a tablet computer, a television, a notebook computer, a UMPC, a handheld computer, a netbook, a PDA, or a smart device (for example, a speaker, a router, or a smart screen).

In an example scenario, the wearable device (such as a watch) and the mobile device (such as a mobile phone) are commonly used together. The following technologies are used to network the watch and the phone.

BLUETOOTH: The BLUETOOTH technology is a wireless communication technology standard. The BLUETOOTH Special Interest Group is responsible for formulating the BLUETOOTH Profile and authenticating and authorizing manufacturers. The BLUETOOTH technology is used to form a personal local area network between devices at a short distance to exchange data. The BLUETOOTH technology has been widely used for a wireless connection between different devices. The mobile phone and the watch may implement a communication connection and information exchange by using the BLUETOOTH technology.

BLUETOOTH low energy (BLE): The BLUETOOTH low energy is a personal local area network technology designed by the BLUETOOTH Special Interest Group to reduce power consumption and costs while maintaining a same communication range. Most mobile operating systems, including IOS, ANDROID, WINDOWS Phone, and BLACK BERRY, and lightweight operating systems, including Watch OS and ANDROID Wear, used for wearable devices all support the BLUETOOTH low energy technology.

Mobile hotspot: A device or area that provides network access through a wireless local area network. According to the Institute of Electrical and Electronics Engineers (IEEE) 802.11U protocol, the mobile hotspot supports cross-device and cross-platform connections, allows a mobile device to automatically discover an available network, authorize and assign a network permission, and allows a device to automatically complete authentication and access the network by using a subscriber identity module (SIM) card or other network access credentials. All mainstream mobile platforms (ANDROID, IOS, WINDOWS Phone, and WINDOWS) support the mobile hotspot technology, including providing a hotspot function and accessing a hotspot enabled on another device.

FIG. 1 shows a networking system, including a mobile phone 100, a watch 200, and a network (or the Internet or an external network) 300. The mobile phone 100 serves as a server, the watch 200 serves as a client, and the network 300 is a network that the watch 200 needs to access, and may be a network server or a cloud server.

There are mainly two manners in which the watch 200 is networked to access the network 300 by using the mobile phone 100.

A first type is a mobile network sharing technology (or a Tethering technology). The mobile network sharing technology refers to sharing, in a wireless or wired manner, a cellular mobile network or a WI-FI network connected to the mobile phone 100 with (the watch 200) for use. Generally, an electronic device that enables the function is also referred to as a mobile hotspot.

According to different access manners in which the watch 200 accesses the mobile phone 100, the mobile network sharing technology may be classified into a WI-FI network sharing technology and a BLUETOOTH network sharing technology. That is, the watch 200 may access the mobile phone 100 by using WI-FI (WI-FI network sharing technology) or BLUETOOTH (BLUETOOTH network sharing technology) based on a situation.

In the mobile network sharing technology, the mobile phone 100 needs to keep awake to monitor a network access data packet of another networked device (for example, the watch 200), so as to implement instant forwarding of the network access data packet. Consequently, power consumption of a server of the mobile network sharing technology, that is, the mobile phone 100, is high.

A second type is a network proxy technology. For example, a BLUETOOTH network proxy technology is currently a mainstream technical solution in the industry. A mainstream watch 200 system, including Watch OS, ANDROID Wear, and the like, uses the technology. In the BLUETOOTH network proxy technology, a routing rule needs to be configured on a watch 200 end, so that a built-in application or a system framework with a special permission can monitor network access data packets of all other applications, and transmit these data packets to the mobile phone 100 by using a pre-established BLUETOOTH transmission channel (or a BLUETOOTH low energy transmission channel), and the mobile phone 100 receives these network access data packets by using an application and forwards the data packets to the network 300. In addition, other applications do not need to sense a specific implementation of a network transmission, and can directly use a universal network access application programming interface (API) to access the network.

Figure 2:
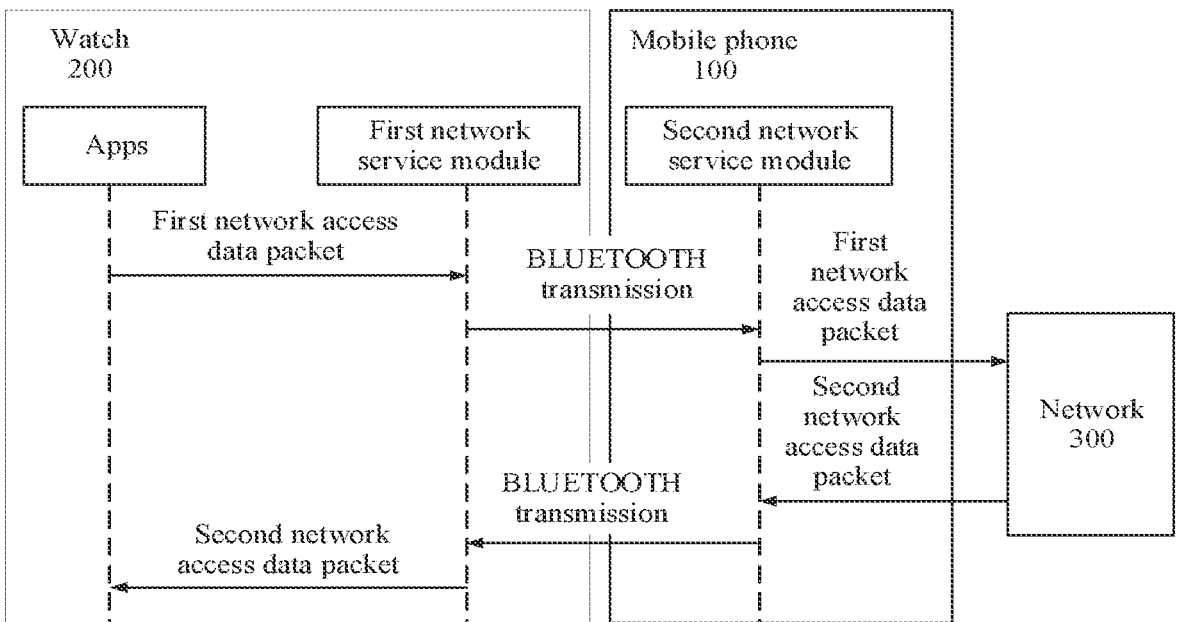
FIG. 2 is a schematic diagram of a proxy networking (surfing) process in the conventional technology.

FIG. 2 shows a process in which a watch 200 implements network access by using a BLUETOOTH network proxy technology via a mobile phone 100 in the conventional technology. A BLUETOOTH communication connection is established between the watch 200 and the mobile phone 100, and the mobile phone 100 accesses the network 300. A network access request of the watch 200 for the network 300 is initiated by an application, that is, the application generates a first network access data packet corresponding to first network access data used as the network access request. The first network access data packet is transmitted, through BLUETOOTH, by a first network service module that provides a network access service in the watch 200 to a second network service module that is configured to provide a network access service in the mobile phone 100, and the second network service module sends the first network access data packet to the network 300. The network 300 generates, based on the network access data requested by the first network access data packet, a second network access data packet (which may alternatively be referred to as a reply data packet or a response data packet) corresponding to the first network access data packet, and the network 300 feeds back the second network access data packet to the second network service module in the mobile phone 100. The second network access data packet is forwarded from the mobile phone 100 to the first network service module in the watch 200 through BLUETOOTH, and then the first network service module transmits the second network access data packet to the application. The application obtains the second network access data packet, and completes access to the network 300.

A transmission channel of the foregoing BLUETOOTH network proxy technology should be attached to BLUETOOTH, that is, the first network access data packet and the second network access data packet are transmitted between the mobile phone 100 and the watch 200 through a BLUETOOTH transmission channel. According to the BLUETOOTH 5.0 protocol, a maximum transmission rate of BLUETOOTH is only 2 Mbps, which is far lower than a transmission rate of a WI-FI or mobile cellular network. Therefore, BLUETOOTH transmission efficiency is low.

In a network proxy networking process, there are a plurality of types of network access data. Considering power consumption and a requirement of the network access data on transmission efficiency in the networking process, only a single network proxy networking manner is provided, that is, a single type of transmission channel provided cannot adapt to transmission of the plurality of types of network access data.

This disclosure provides a networking method, applied to a scenario in which a network access proxy service is performed between electronic devices. In the networking method provided in this disclosure, a plurality of types of transmission channels may be supported between an electronic device (for example, a watch) used as a client and an electronic device (for example, a mobile phone) used as a server. That is, after the client and the server discover each other in a local area network, the client and the server may negotiate and determine, based on respective hardware capabilities (or device capabilities) and actual communication requirements, N (N≥2) types of transmission channels used for network access data transmission of a network access proxy service in the local area network, and determine a channel characteristic of each transmission channel. The channel characteristic of the transmission channel includes a power consumption characteristic, the power consumption characteristic refers to a power consumption value generated when the transmission channel transmits network access data and/or maintains the transmission channel, and a parameter used to reflect the power consumption characteristic includes a power consumption threshold. In addition, the channel characteristic may further include a bandwidth characteristic, a bandwidth threshold is a maximum bandwidth allowed to pass through the transmission channel, and a parameter used to reflect the bandwidth characteristic includes the bandwidth threshold. In addition, the channel characteristic may further include another characteristic.

The transmission channel may be at least two of a USB direct transmission channel, an Ethernet data line direct transmission channel, a WI-FI direct transmission channel, a BLUETOOTH transmission channel, and a BLUETOOTH low energy transmission channel, and certainly may be a transmission channel of another type.

During networking, a transmission channel with a lowest power consumption threshold may be first selected between the client and the server as a default transmission channel (or an initial transmission channel or a basic transmission channel), or a transmission channel with the maximum bandwidth is selected as a default transmission channel, where the default transmission channel is used to ensure that communication is maintained between devices. Then, in a subsequent networking process, the client and the server may select a proper transmission channel from a plurality of transmission channels of different types based on a data characteristic of network access data to transmit the network access data, so that power consumption overheads and bandwidth conflicts between different transmission channels can be balanced, and other conflicts can also be balanced.

For example, when an application in the client initiates a first network access data packet, the client automatically selects, based on a characteristic of the first network access data packet, a transmission channel as a first transmission channel for the first network access data packet by using a transmission channel decision algorithm, and transmits the first network access data packet through the first transmission channel. In addition, the client may further notify the server of transmitting the first network access data packet through the first transmission channel. In addition, the server may also select, based on a characteristic of a second network access data packet returned by a network, a transmission channel as a second transmission channel by using the transmission channel decision algorithm, and transmit the second network access data packet through the second transmission channel. In addition, the server may further notify the client of transmitting the second network access data packet through the second transmission channel.

In the networking process, the client and the server may select, based on the data characteristic of the transmitted network access data, a proper transmission channel from the plurality of transmission channels to enable the transmission channel for transmitting the network access data, and disable the transmission channel after the network access data transmission and backhaul are completed. In addition, the transmission channel that is used as the default transmission channel may be continuously enabled. Certainly, when the transmission channel is enabled, the transmission channel may be switched to a disabled state, and when the transmission channel is disabled, the default transmission channel is enabled according to a use requirement.

It should be noted that, the network access data is transmitted in a form of a network access data packet. Transmitting the network access data is transmitting the network access data packet. A data characteristic of the network access data is a characteristic of the network access data packet. The network access data packet includes but is not limited to the foregoing first network access data packet and second network access data packet. The first network access data packet may be a network access request data packet corresponding to the network access request, and the second network access data packet may be the reply data packet of the network in response to the network access request.

In addition, in this disclosure, the network access data packet may be a Transmission Control Protocol (TCP)/IP data packet.

To describe the networking method provided in this disclosure, this disclosure provides a networking system shown in FIG. 1 that is used as a carrier of the networking method according to this disclosure. However, an application scenario of this disclosure is not limited to the system and the scenario shown in FIG. 1, alternatively may be that another device other than the watch 200 and the mobile phone 100 or another electronic device may perform a networking operation based on the method in this disclosure.

Figure 3A:
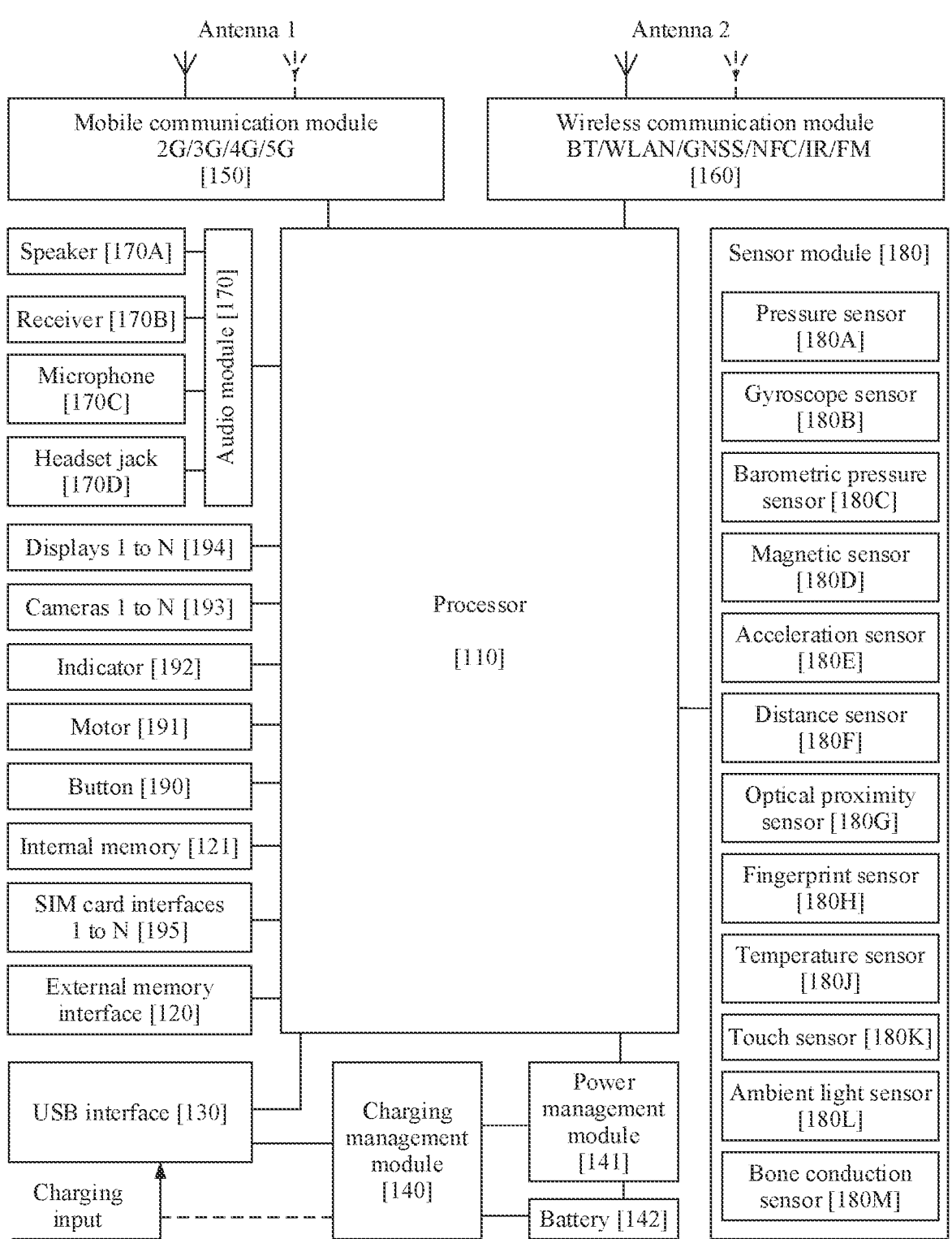
FIG. 3A is a schematic diagram of a structure of a mobile phone according to some implementations of this disclosure.

FIG. 3A is a schematic diagram of a structure of a mobile phone 100 according to an embodiment of this disclosure.

The mobile phone 100 may include a processor 110, an external memory interface 120, an internal memory 121, a USB interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the mobile phone 100. In some other embodiments of this disclosure, the mobile phone 100 may include more or fewer components than those shown in the figure, or combine some components, or split some components, or have different component arrangements.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The processor 110 may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a mobile industry processor interface (MIPI), a general-purpose input/output (GPIO) interface, and a SIM interface.

The USB interface 130 is a connector that complies with a USB standard specification, and may be configured to connect the mobile phone 100 and a peripheral device, and may be a standard USB interface (for example, a Type C interface), a Mini USB interface, a Micro USB interface, or the like. The USB interface 130 may be configured to connect to a charger to charge the mobile phone 100, or may be configured to transmit data between the mobile phone 100 and the peripheral device. The interface may be further configured to connect to another electronic device such as an AR device. The USB interface 130 may also be used to implement the foregoing USB transmission channel. In some implementation solutions, the processor 110 may support a USB, and a standard specification of the USB may be USB 1.x, USB 2.0, USB 3.x, or USB 4.

A wireless communication function of the mobile phone 100 may be implemented through the antenna 1, the antenna 2, the mobile communication module 150, the wireless communication module 160, the modem processor, the baseband processor, and the like.

The mobile communication module 150 may provide a wireless communication function such as second generation (2G)/third generation (3G)/fourth generation (4G)/fifth generation (5G) applied to the mobile phone 100. In addition, if the network 300 is a cellular network, the mobile phone 100 accesses the network 300 by using the mobile communication module 150.

The wireless communication module 160 may provide a wireless communication solution that includes a WLAN (for example, WI-FI), BLUETOOTH, a global navigation satellite system (GNSS), frequency modulation (FM), a near-field communication (NFC) technology, an infrared (IR) technology, and the like and that is applied to the mobile phone 100. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The wireless communication module 160 may include a module configured to implement local area network transmission, for example, a WI-FI communication module or a BLUETOOTH communication module (or the wireless communication module 160 may include a component configured to implement local area network transmission, for example, a WI-FI chip or a BLUETOOTH chip), and is configured to implement the foregoing WI-FI direct transmission, BLUETOOTH transmission, BLUETOOTH low energy transmission, and the like.

In some embodiments, in the mobile phone 100, the antenna 1 and the mobile communication module 150 are coupled, and the antenna 2 and the wireless communication module 160 are coupled, so that the mobile phone 100 can communicate with a network and another device by using a wireless communication technology.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created during use of the mobile phone 100. In addition, the internal memory 121 may include a high-speed random-access memory, or may include a nonvolatile memory, for example, at least one magnetic disk storage device, a flash memory, or a Universal Flash Storage (UFS). The processor 110 executes various functional applications of the mobile phone 100 and data processing of the mobile phone 100 by running the instructions stored in the internal memory 121 and/or instructions stored in the memory that is disposed in the processor.

In addition, the mobile phone 100 may further include an Ethernet cable interface and a driver chip (not shown in the figure), and may be configured to connect the mobile phone 100 to the peripheral device.

Figure 3B:
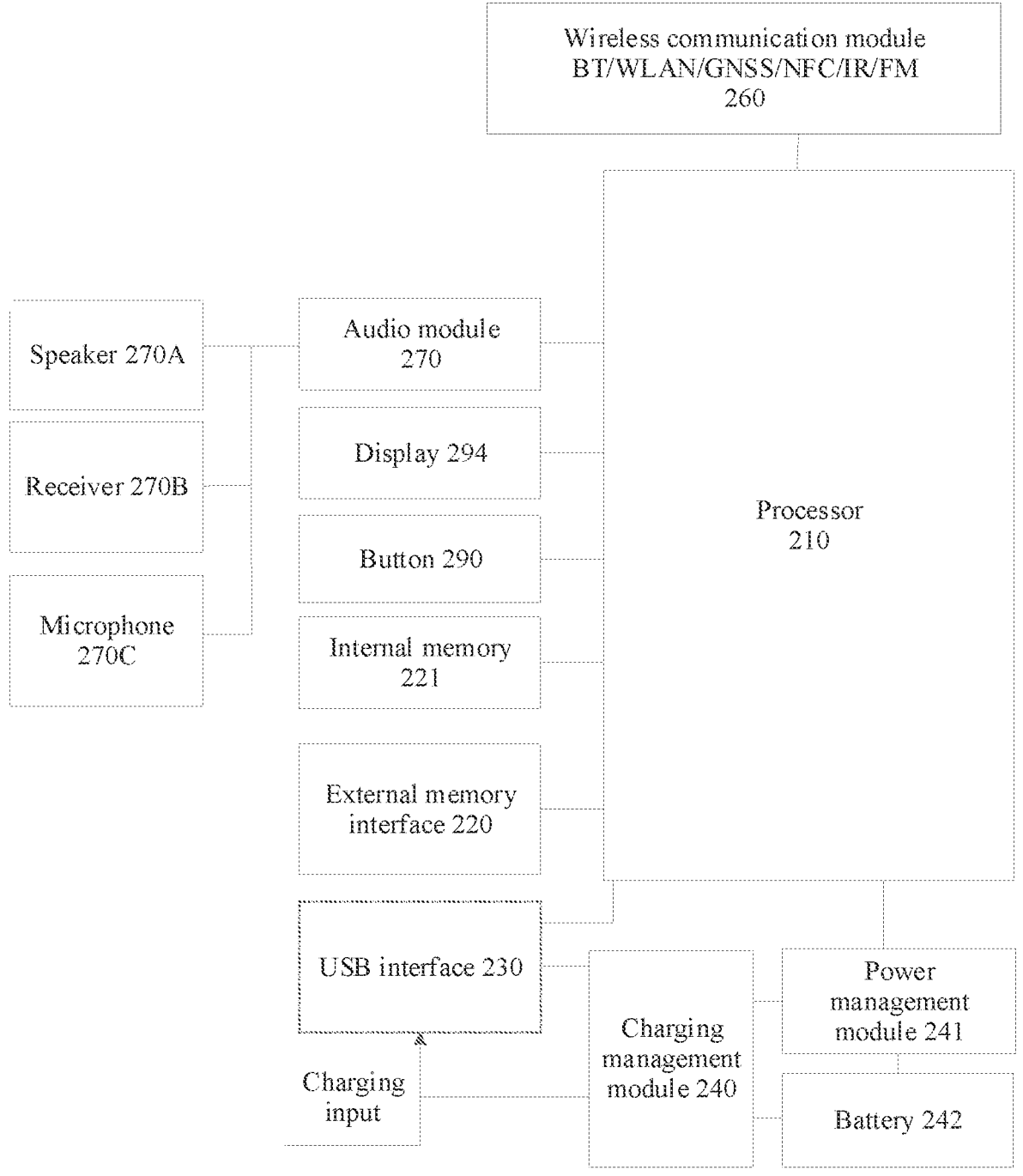
FIG. 3B is a schematic diagram of a structure of a watch according to some implementations of this disclosure.

FIG. 3B is a schematic diagram of a structure of an example of a wearable electronic device according to an embodiment of this disclosure. The structural diagram shown in FIG. 3B is also applicable to the watch 200 shown in FIG. 1. The following uses the watch 200 as an example for specific description.

The watch 200 may include a processor 210, an external memory interface 220, an internal memory 221, a USB interface 230, a charging management module 240, a power management module 241, a battery 242, a wireless communication module 260, an audio module 270, a speaker 270A, a receiver 270B, a microphone 270C, a display 294, and the like.

It may be understood that the structure shown in this embodiment of this disclosure does not constitute a specific limitation on the watch 200. In some other embodiments of this disclosure, the watch 200 may include more or fewer components than those shown in the figure, or combine some components, or split some components, or have different component arrangements.

The wireless communication module 260 may provide a wireless communication solution that is applied to the watch 200 and that includes WLAN (such as WI-FI) and BLUETOOTH. The wireless communication module 260 may be one or more components integrating at least one communication processor module.

The wireless communication module 260 may include a component configured to implement local area network transmission, for example, a WI-FI chip or a BLUETOOTH chip (or the wireless communication module 260 may include a module configured to implement local area network transmission, for example, a WI-FI communication module or a BLUETOOTH communication module), and is configured to implement the foregoing WI-FI direct transmission, BLUETOOTH transmission, BLUETOOTH low energy transmission, and the like.

For a wearable device such as the watch 200, generally, the USB interface 230 may not be disposed. For some wearable devices, a USB interface may alternatively be disposed. The USB interface 230 may be configured to implement a USB transmission channel between the watch 200 and the mobile phone 100, and charge the watch 200.

In addition, functions of other components in the watch 200 are the same as or similar to functions of corresponding components in the mobile phone 100. Details are not described herein again.

In this disclosure, an example in which the client is the watch 200 is used for description, but the client may alternatively be another wearable device such as a band or glasses.

Figure 3C:
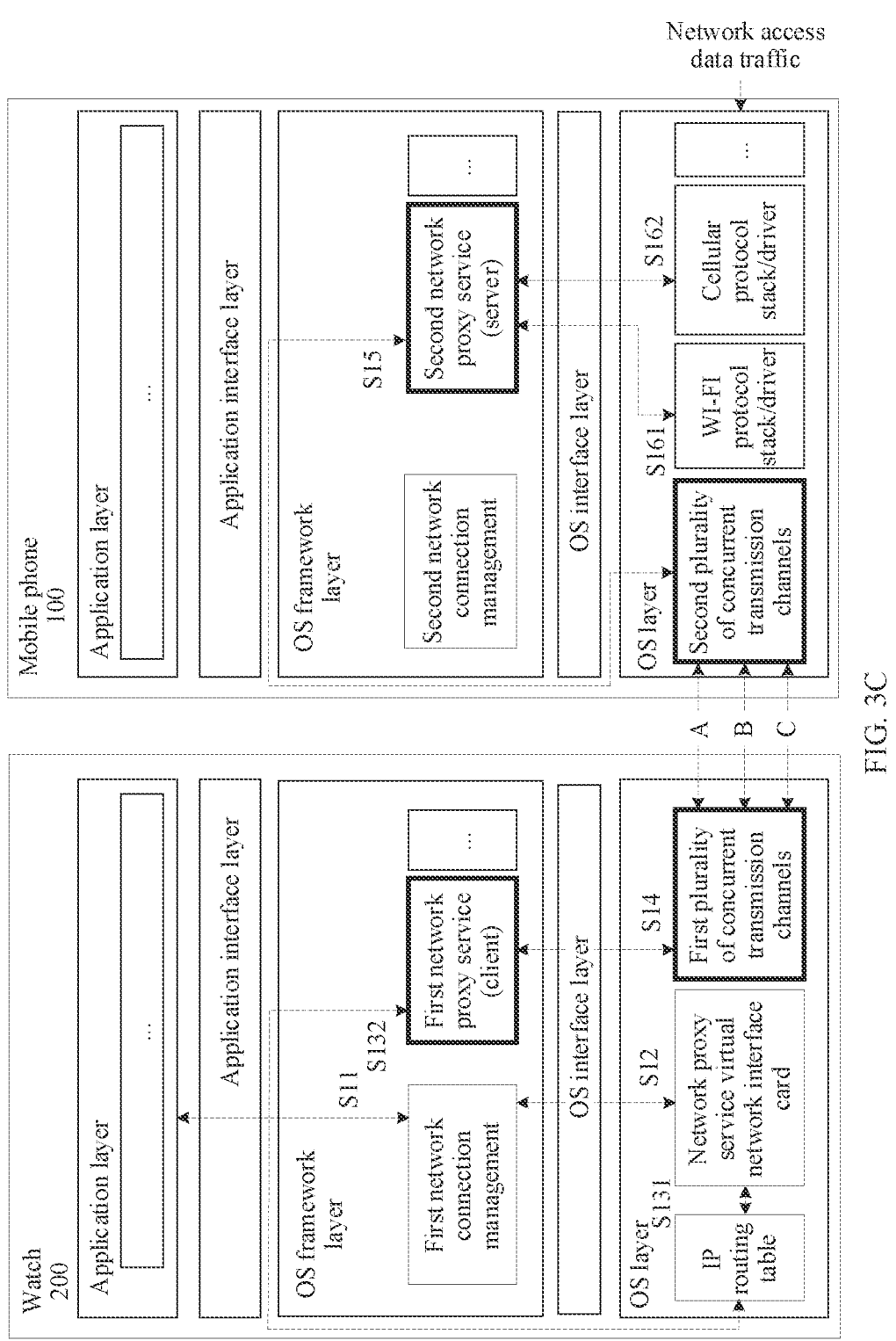
FIG. 3C is a schematic diagram of structures of software frameworks of a watch and a mobile phone according to some implementations of this disclosure.

FIG. 3C is a block diagram of a software structure of a mobile phone 100 and a watch 200 according to an embodiment of this disclosure.

In a layered architecture, software is divided into several layers, and each layer has a clear role and task. The layers communicate with each other through a software interface. In some embodiments, systems of the mobile phone 100 and the watch 200 may be divided into an application layer, an operating system (OS) framework layer, and an OS layer. An application interface layer may be further included between the application layer and the OS framework layer, and an OS interface layer is further included between the OS framework layer and the OS layer.

The application layer may include a series of application packages. The application package may include applications (not shown in the figure) such as camera, gallery, calendar, phone, maps, weather, navigation, WLAN, BLUETOOTH, music, videos and messages (only some are shown in the figure).

The OS framework layer provides an API and a programming framework for an application at the application layer. The OS framework layer includes some predefined functions.

As shown in FIG. 3C, the OS framework layer of the watch 200 includes but is not limited to a first network connection management module and a first network proxy service (as a client) module. The OS layer of the watch 200 includes but is not limited to an IP routing table (IP Table), a virtual network interface card for a network proxy service, and a first plurality of concurrent transmission channel modules.

The first network proxy service module is a core service module of the watch 200 for managing a network proxy, and the first network proxy service module is mainly responsible for the following functions.

① A device discovery function of the watch 200 is implemented, that is, the first network proxy service module may enable the watch 200 to discover the mobile phone 100 in the local area network, and complete pairing and connection to the mobile phone 100.

② A function of negotiating a transmission channel between the watch 200 and the mobile phone 100 based on device capabilities of the watch 200 and the mobile phone 100 is implemented, to determine a transmission channel supported by the watch 200 and the mobile phone 100, and determine a channel characteristic of each transmission channel. The channel characteristic includes a power consumption characteristic, a transmission bandwidth characteristic, and the like. The negotiation of the transmission channel between the watch 200 and the mobile phone 100 may be performed based on a device capability (including whether a WI-FI communication module and a BLUETOOTH communication module is disposed, whether a USB connection is established, and the like) after the watch 200 and the mobile phone 100 are successfully paired to establish a communication connection.

③ After the watch 200 and the mobile phone 100 negotiate to determine the transmission channel, the first network proxy service module establishes the virtual network interface card for the network proxy service, configures basic information and a routing rule of the virtual network interface card for the network proxy service, and configures the IP routing table. The virtual network interface card for the network proxy service is used by the watch 200 to direct a first network access data packet in the watch 200 to the first network proxy service module by using the configured IP routing table, so as to implement a function of monitoring the first network access data packet of the first network proxy service module, so that another application can directly use a network access proxy service without awareness and adaptation. The basic information of the virtual network interface card for the network proxy service includes, for example, information such as an IP address of a DNS server, a network protocol and bandwidth supported by the virtual network interface card for the network proxy service, and the routing rule refers to information specified in advance that is about forwarding, in the IP routing table, the first network access data packet based on a different protocol (for example, a TCP protocol or a User Datagram Protocol (UDP)) to the first network proxy service module. The IP routing table specifies a rule for forwarding the first network access data packet in the system to the first network proxy service module, so as to implement a function of monitoring the first network access data packet by the first network proxy service module. In addition, the first network proxy service module is further configured to disable the virtual network interface card for the network proxy service when the virtual network interface card for the network proxy service is not used.

④ The first network access data packet is monitored, that is, the first network proxy service module is configured to monitor all first network access data packets of the watch 200, so as to forward the first network access data packet to the mobile phone 100 according to a requirement to implement network access.

⑤ A transmission channel in a transmission process of the first network access data packet is selected, that is, the first network proxy service module may manage transmission of the first network access data packet, and select a to-be-used transmission channel by using a transmission channel decision algorithm based on a characteristic of the first network access data packet. After the to-be-used transmission channel is selected, a corresponding transmission channel is enabled or disabled according to a requirement for transmission of the first network access data packet.

⑥ Forwarding of the first network access data packet is recorded, that is, the first network proxy service module records data packet information (including quintuple information such as port information and transmission link information) of the first network access data packet on which the network access is being performed, so that when a second network access data packet returned by the network 300 is received, the second network access data packet corresponding to each first network access data packet may be determined based on the data packet information of the second network access data packet and the data packet information of the first network access data packet, and forwards the second network access data packet returned by the network 300 back to a corresponding application.

The first network connection management module is configured to support a network connection service of the watch 200, and may be a standard network connection service interface in a system.

The virtual network interface card for the network proxy service is a virtual network interface card generated by the first network proxy service module and configured to implement monitoring of the first network access data packet. The virtual network interface card for the network proxy service is configured to direct all the first network access data packets in the watch 200 to the first network proxy service module based on the IP routing table configured by the first network proxy service module, so as to implement a function of monitoring the first network access data packet by the first network proxy service module.

The IP routing table runs at the OS layer, and specifies a forwarding rule of the first network access data packet in the system, so that the virtual network interface card for the network proxy service implements the function of directing the first network access data packet to the first network proxy service module in a transmission process of the first network access data packet, to implement a function of the first network proxy service module for monitoring the first network access data packet.

The first plurality of concurrent transmission channel modules includes a plurality of transmission channels in a local area network that are established by the watch 200 and the mobile phone 100 through negotiation, the transmission channels do not affect each other, all the transmission channels can transmit data between the watch 200 and the mobile phone 100, and each transmission channel may be respectively started or may be simultaneously started according to a requirement. In addition, each transmission channel has its own channel characteristic.

Compared with the software system of the watch 200, in the software system of the mobile phone 100, the OS framework layer of the mobile phone 100 includes but is not limited to a second network connection management module and a second network proxy service module. The OS layer of the mobile phone 100 includes but is not limited to a second plurality of concurrent transmission channel modules, a WI-FI protocol stack (or a driver), and a cellular protocol stack (or a driver).

The second network proxy service module is a core service module of the mobile phone 100 for managing a network proxy. A function of the second network proxy service module is similar to a function of the first network proxy service module of the watch 200. For example, the second network proxy service module may also implement the device discovery function of the mobile phone 100, so that the mobile phone 100 can discover the watch 200 in a local area network and complete a pairing connection with the watch 200, to implement a function of negotiating a transmission channel between the watch 200 and the mobile phone 100 based on device capabilities of the watch 200 and the mobile phone 100, a function of monitoring the second network access data packet in the mobile phone 100, a function of selecting a transmission channel in a transmission process of the second network access data packet, a function of recording forwarding of the second network access data packet, and the like. Details are not described herein.

It should be noted that, because the mobile phone 100 does not have a virtual network interface card for a network proxy service, the second network proxy service module of the mobile phone 100 is different from the first network proxy service module of the watch 200, and may not need to implement a function of configuring the virtual network interface card for the network proxy service and the IP routing table.

The second network connection management module is configured to support a network connection service of the mobile phone 100, and may be a standard network connection service interface in a system.

The second plurality of concurrent transmission channel modules are the same as or similar to the first plurality of concurrent transmission channel modules in function in the foregoing watch 200, and include a plurality of transmission channels in the local area network that are established by the watch 200 and the mobile phone 100 through negotiation. Details are not described herein again.

The WI-FI protocol stack and the cellular protocol stack have a network access capability, and are used by the mobile phone 100 to actually access the network 300.

In this disclosure, the software structure shown in FIG. 3C may be configured for the watch 200 before the watch 200 is delivered from a factory, that is, the software structure shown in FIG. 3C is integrated into a system of the watch 200. Alternatively, a system update may be performed on the watch 200 that does not have the software structure shown in FIG. 3C before delivery, so that the watch 200 has the software structure shown in FIG. 3C. An update manner may be updating by using a technology such as an over the air (OTA) technology. For example, the network 300 may push an update data packet to the watch 200 by using the mobile phone 100, and the watch 200 obtains the update data packet for update, to have the software structure shown in FIG. 3C.

In this disclosure, the software structure shown in FIG. 3C may be configured for the mobile phone 100 before the mobile phone 100 is delivered from a factory, that is, the software structure shown in FIG. 3C is integrated into a system of the mobile phone 100. Alternatively, a system update may be performed on the mobile phone 100 that does not have the software structure shown in FIG. 3C before delivery, so that the mobile phone 100 has the software structure shown in FIG. 3C. An update manner may be updating by using a technology such as an OTA technology. For example, the network 300 may push an update data packet to the mobile phone 100, and the mobile phone 100 obtains the update data packet for update, to have the software structure shown in FIG. 3C.

It should be noted that systems of the mobile phone 100 and the watch 200 in this disclosure may be ANDROID systems, or may be any other system such as a HarmonyOS system, a LiteOS system, or an IOS system.

As shown in FIG. 3C, when a communication connection is established between the watch 200 and the mobile phone 100, there are three transmission channels determined by the watch 200 and the mobile phone 100 through negotiation. To be specific, there are three transmission channels supported between a first multipath transmission channel module in the watch 200 and a second multipath transmission channel module in the mobile phone 100: a transmission channel A, a transmission channel B, and a transmission channel C. The transmission channel A may be a BLUETOOTH transmission channel, the transmission channel B may be a WI-FI direct transmission channel, and the transmission channel C may be a BLUETOOTH low energy transmission channel. In addition, the communication connection established between the watch 200 and the mobile phone 100 may be the BLUETOOTH low energy communication connection, that is, the watch 200 and the mobile phone 100 select the BLUETOOTH low energy transmission channel as a default transmission channel.

The negotiating, by the watch 200, the transmission channel with the mobile phone 100 may be determined based on device capabilities of the watch 200 and the mobile phone 100 after the watch 200 and the mobile phone 100 are successfully paired to establish the BLUETOOTH low energy connection.

In addition, FIG. 3C shows an example of a direction of a network access data packet (or data traffic) in the watch 200 and the mobile phone 100 when the transmission channel is determined between the watch 200 and the mobile phone 100 through negotiation. For example, the direction of the network access data packet in the watch 200 and the mobile phone 100 is further shown as follows.

S11: When an application at an application layer in the watch 200 receives a network access trigger operation of a user and needs to be networked to access the network 300, the application sends, to a first network connection management module at an OS framework layer, for example, a first network access data packet used to request network access data.

S12: The first network connection management module at the OS framework layer in the watch 200 forwards the first network access data packet to a virtual network interface card for a network proxy service at the OS layer.

S131: the virtual network interface card for the network proxy service forwards the first network access data packet to an IP routing table running at the OS layer.

S132: The IP routing table sends the first network access data packet to a first network proxy service module at the OS framework layer based on a forwarding rule of the first network access data packet that is configured in the IP routing table by the first network proxy service module.

S14: The first network proxy service module matches a characteristic of the first network access data packet with a characteristic of a transmission channel, so as to determine a transmission channel of the first network access data packet. After determining the transmission channel of the first network access data packet, the first network proxy service module sends the first network access data packet to the determined transmission channel.

If the determined transmission channel is the WI-FI direct transmission channel, the first network proxy service module instructs the first multipath transmission channel module to select and enable the WI-FI direct transmission channel to transmit the first network access data packet to the mobile phone 100. In addition, the first network proxy service module instructs, by using the BLUETOOTH low energy transmission channel as the default transmission channel, the mobile phone 200 to select and enable the WI-FI direct transmission channel to transmit the first network access data packet.

S15: After receiving the first network access data packet, the second multipath transmission channel module at the OS layer in the mobile phone 100 transmits the first network access data packet to the second network proxy service module at the OS framework layer in the mobile phone 100.

After the second network proxy service module receives the first network access data packet, if the mobile phone 100 currently accesses the network 300 in a WI-FI manner, the mobile phone 100 performs step S161 to send the first network access data packet to a WI-FI protocol stack (or a driver), and the WI-FI protocol stack (or the driver) sends the first network access data packet to the network 300.

If the mobile phone 100 accesses the network 300 in a cellular manner, the mobile phone 100 performs step S162 to send the first network access data packet to a cellular network protocol stack (or a driver), and the cellular network protocol stack (or the driver) sends the first network access data packet to the network 300. That is, the mobile phone 100 sends the first network access data packet to the network 300 based on a communication connection manner between the mobile phone 100 and the network 300.

Further, after receiving the first network access data packet, the network 300 determines, based on data information for requesting network access included in the first network access data packet, reply data corresponding to the first network access data packet as a second network access data packet, and the network 300 returns the second network access data packet to the mobile phone 100 by using the WI-FI protocol stack (or the driver) (or cellular network protocol stack (or driver)). After the network 300 returns the second network access data packet to the mobile phone 100 by using the WI-FI protocol stack (or driver) (or cellular network protocol stack (or driver)), the method further includes the following. The WI-FI protocol stack (or driver) (or cellular network protocol stack (or driver)) sends the second network access data packet to the second network proxy service module.

After receiving the second network access data packet, the second network proxy service module in the mobile phone 100 determines, based on a forwarding record of the first network access data packet, that the second network access data packet is a second network access data packet corresponding to the first network access data packet. The second network proxy service module in the mobile phone 100 determines a transmission channel of the second network access data packet, and the second network proxy service module transmits the second network access data packet to the determined transmission channel. The transmission channel may be a transmission channel previously determined by the mobile phone 100 and the watch 200 through negotiation, or may be a transmission channel re-determined by the mobile phone 100 based on a characteristic of the second network access data packet.

After receiving the second network access data packet, the first multipath transmission channel module of the watch 200 transmits the second network access data packet to the first network proxy service module in the watch 200. The first network proxy service module transmits the second network access data packet to the first network connection management module by using the IP routing table and the virtual network interface card for the network proxy service, and then transmits the second network access data packet to a service application by using the first network connection management module, so as to complete network access of the application.

FIG. 3C shows an example of a direction of a network access data packet in the watch 200 and the mobile phone 100 when a communication connection is established, and a transmission channel is determined between the watch 200 and the mobile phone 100 through negotiation. The following explains a process in which the watch 200 and the mobile phone 100 establish a communication connection and determine a transmission channel through negotiation.

Figure 4A:
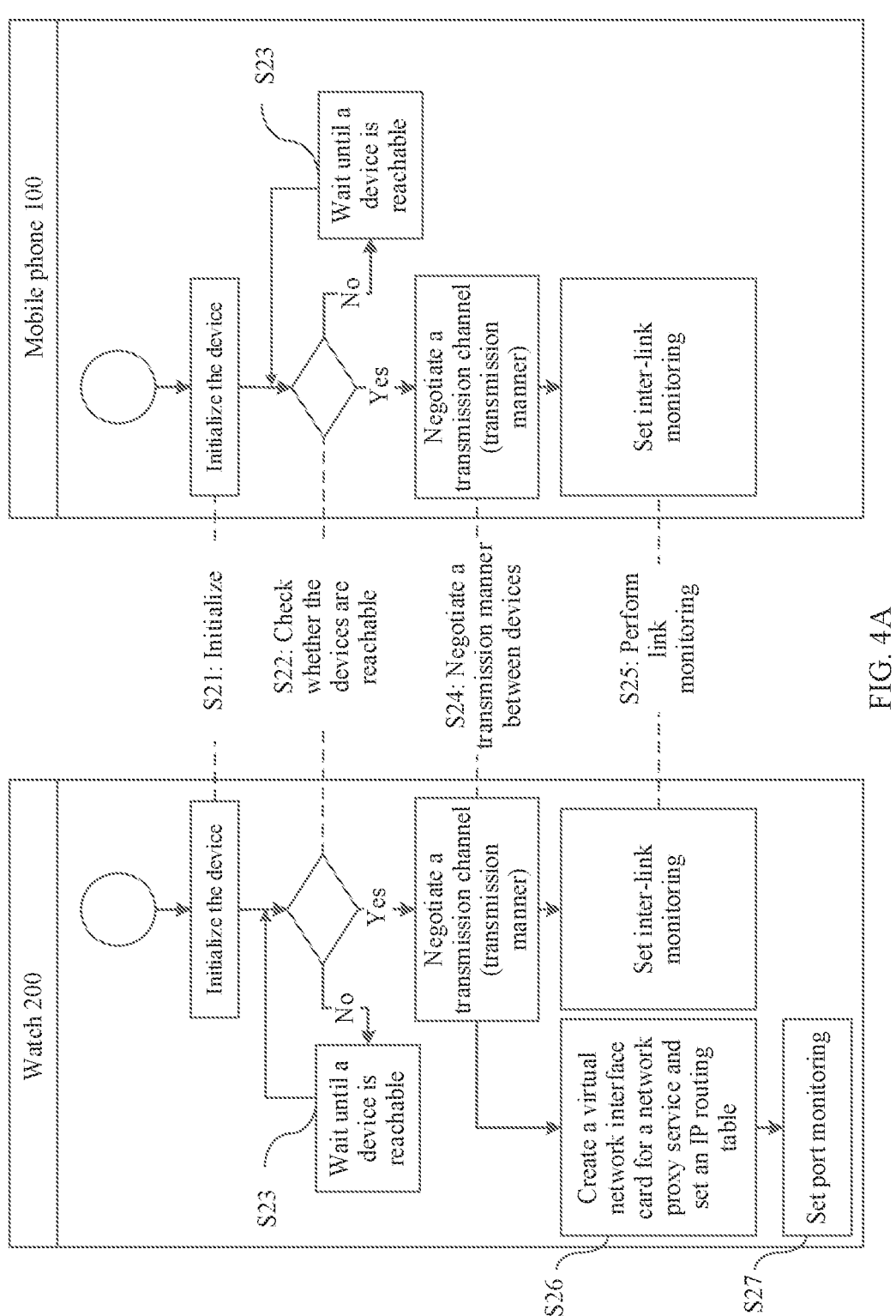
FIG. 4A is a schematic diagram of a process in which a mobile phone and a watch establish a communication connection and negotiate a transmission channel according to some implementations of this disclosure.

For example, in a use scenario, a user has two devices: the watch 200 (used as a client) and the mobile phone 100 (used as a server), and the two devices have sufficient power. As shown in FIG. 4A, a process in which the watch 200 and the mobile phone 100 discover each other, establish a communication connection, and negotiate a transmission channel includes the following steps.

S21: The watch 200 and the mobile phone 100 are initialized.

That the watch 200 and the mobile phone 100 are initialized may mean that no communication connection currently exists between the mobile phone 200 and the mobile phone 100, or no communication connection is established between the mobile phone 200 and the mobile phone 100. For example, when the watch 200 is paired with the mobile phone 100 for a first time, it may be considered that the watch 200 and the mobile phone 100 are initialized, or when the watch 200 and the mobile phone 100 enable BLUETOOTH or are powered on again, it may be considered that the watch 200 and the mobile phone 100 are initialized.

S22: The watch 200 and the mobile phone 100 check whether a device is reachable, that is, the watch 200 and the mobile phone 100 perform device discovery, the mobile phone 100 checks whether there is a device watch 200 that can establish a communication connection, and the watch 200 checks whether there is a device mobile phone 100 that can establish a communication connection. If the watch 200 and the mobile phone 100 perform device discovery in a BLUETOOTH low energy manner, the establishing a communication connection herein refers to establishing a BLUETOOTH low energy connection.

If a device is reachable (the watch 200 and the mobile phone 100 that can establish the BLUETOOTH low energy communication connection exist respectively), perform step S24. If no device is reachable (the watch 200 and the mobile phone 100 that can establish the BLUETOOTH low energy communication connection do not exist respectively), perform step S23.

S23: The watch 200 and the mobile phone 100 wait until a device is reachable, that is, the watch 200 and the mobile phone 100 wait for establishing a connection to each other.

S24: The watch 200 performs pairing with the mobile phone 100. After the pairing succeeds, the watch 200 establishes a communication connection to the mobile phone 100, and negotiates a transmission manner between the devices, that is, negotiates a transmission channel.

For example, if the watch 200 and the mobile phone 100 perform device discovery in the BLUETOOTH low energy manner, after the watch 200 and the mobile phone 100 are successfully paired, a BLUETOOTH low energy connection may be established. A BLUETOOTH low energy transmission channel corresponding to the BLUETOOTH low energy connection may be used as a default transmission channel, and is always enabled in a subsequent networking process, so as to ensure communication between the devices.

Figure 4B:
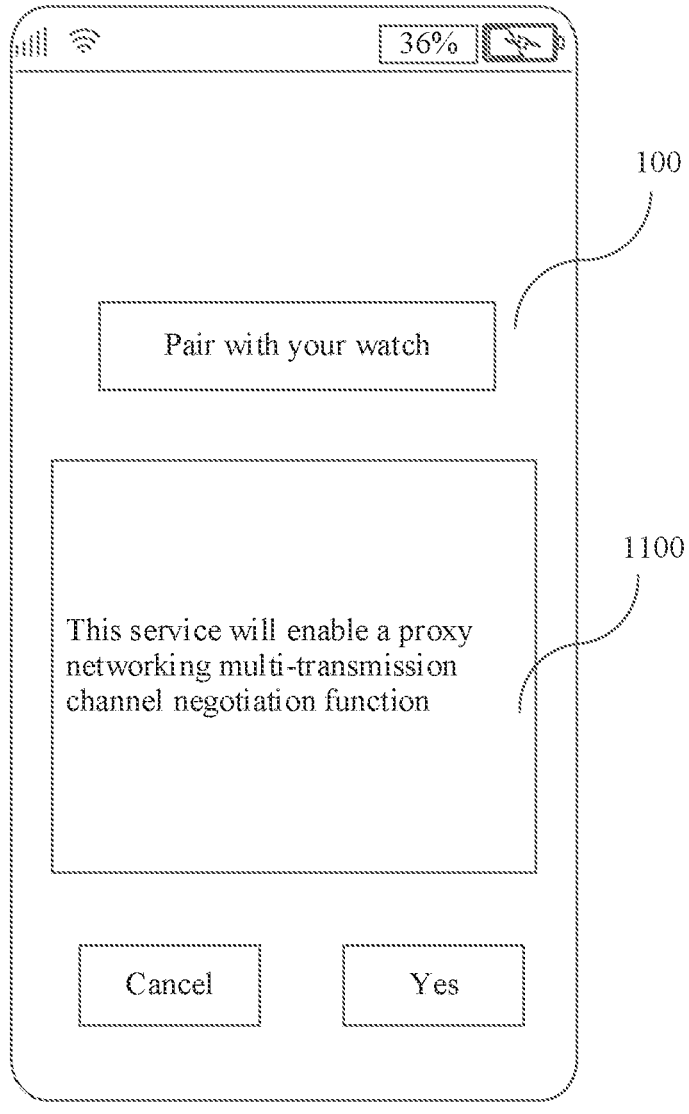
FIG. 4B and FIG. 4C are schematic diagrams of some manners of enabling a transmission channel negotiation function by a mobile phone and a watch according to some implementations of this disclosure.

Then, the watch 200 and the mobile phone 100 determine whether to negotiate a transmission channel. The negotiation may be as follows. When the watch 200 and the mobile phone 100 are paired for a first time, the mobile phone 100 displays a statement 1100 shown in FIG. 4B (the mobile phone 100 displays description "the service is to enable a proxy networking multi-transmission channel negotiation function", and an "ok" control and a "cancel" control), to provide description that the watch 200 and the mobile phone 100 may enable a function of negotiating a transmission channel in a communication process by using the statement. If the mobile phone 100 detects a trigger operation performed by the user on the "ok" control, the mobile phone 100 negotiates a transmission channel with the watch 200 in the communication process between the watch 200 and the mobile phone 100. If the mobile phone 100 detects a trigger operation performed by the user on the "cancel" control, the mobile phone 100 does not negotiate a transmission channel with the watch 200 in the communication process between the watch 200 and the mobile phone 100.

Figure 4C:
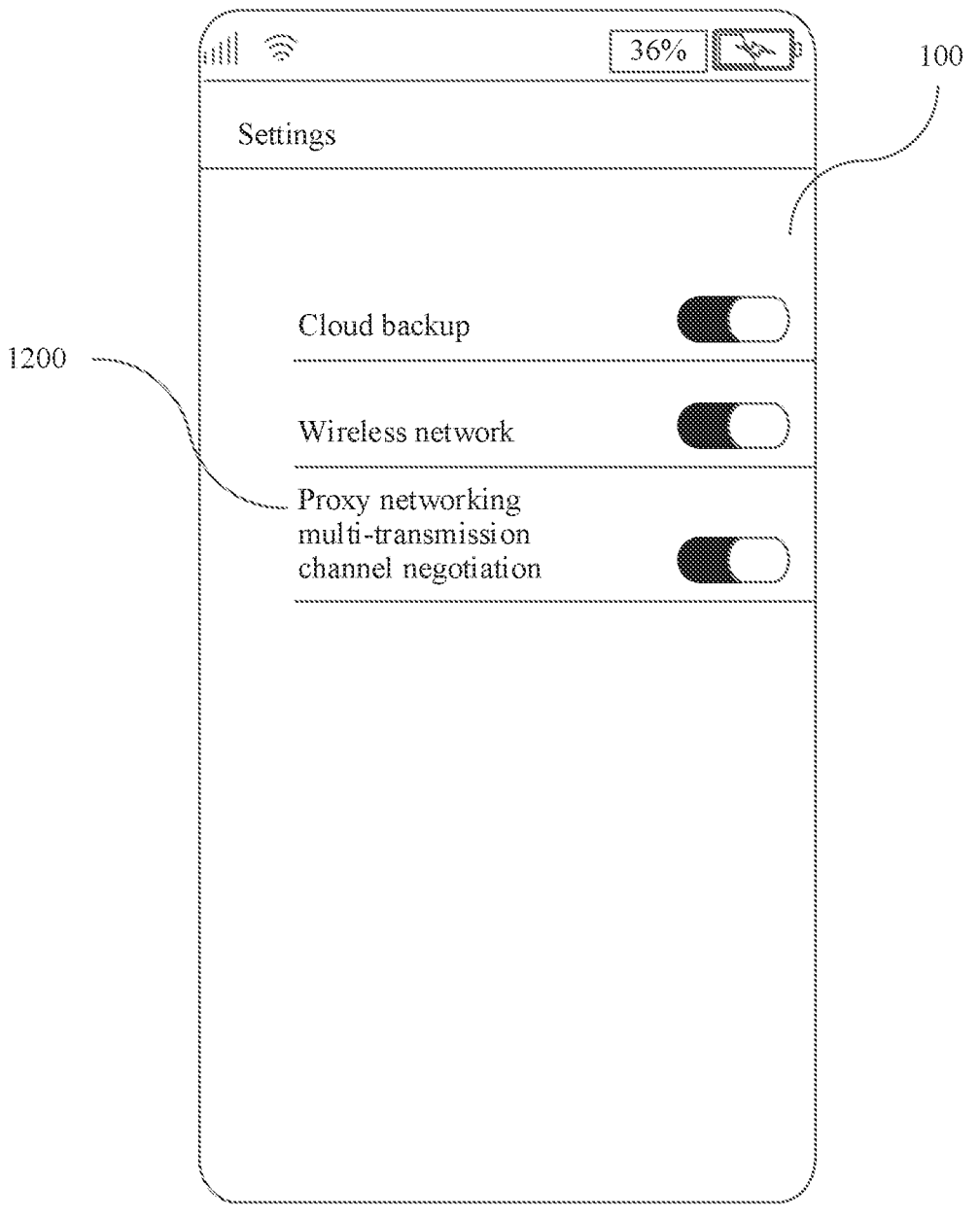

In addition, the mobile phone 100 may set a control used by the user to control whether to negotiate a transmission channel. For example, as shown in FIG. 4C, a "proxy networking multi-transmission channel negotiation" selection control 1200 may be set under a "setting" control. When the watch 200 and the mobile phone 100 are paired for the first time, the mobile phone 100 displays a display interface shown in FIG. 4C. If the mobile phone 100 detects an operation of enabling the "proxy networking multi-transmission channel negotiation" function by the user, the mobile phone 100 negotiates a transmission channel with the watch 200 in the communication process between the watch 200 and the mobile phone 100. If the mobile phone 100 detects the operation of disabling the "proxy networking multi-transmission channel negotiation" function by the user, the mobile phone 100 does not negotiate a transmission channel with the watch 200 in the communication process between the watch 200 and the mobile phone 100.

The watch 200 and the mobile phone 100 determine whether to negotiate a transmission channel. In other words, in a use scenario of the mobile phone 100 of the watch 200, if the watch 200 reaches a preset state (for example, the watch 200 detects that power of the watch 200 is lower than a specific power value, or the watch 200 detects that a signal of an original network connected to the watch 200 is unstable), the watch 200 sends a negotiation request to the mobile phone 100. After receiving the negotiation request, if the mobile phone 100 determines to enable the proxy networking multi-transmission channel negotiation function with the watch 200 (for example, if the mobile phone 100 detects an operation of enabling the proxy networking multi-transmission channel negotiation function by the user, the mobile phone 100 determines to enable the proxy based networking multi-transmission channel negotiation function), the mobile phone 100 sends a response to the watch 200 to agree to perform negotiation. After the watch 200 receives the response, a communication connection is established between the watch 200 and the mobile phone 100 for negotiation of the transmission channel.

Certainly, the watch 200 and the mobile phone 100 may alternatively determine, when another transmission channel negotiation condition is met, whether to perform transmission channel negotiation according to a requirement.

In the communication process, the mobile phone 100 and the watch 200 may negotiate the transmission manner, that is the transmission channel, between the mobile phone 100 and the watch 200 by using the BLUETOOTH low energy transmission channel that has been established between the mobile phone 100 and the watch 200.

The following describes an example of negotiating a transmission channel according to an implementation of this disclosure.

In an implementation of this disclosure, when the watch 200 establishes a BLUETOOTH low energy connection to the mobile phone 100, a process of negotiating the transmission channel between the watch 200 and the mobile phone 100 may be as follows. The watch 200 and the mobile phone 100 notify, by using an existing BLUETOOTH low energy transmission channel, each other of a transmission channel supported by their own devices. As shown in Table 1, the transmission channel supported by the mobile phone 100 includes a BLUETOOTH transmission channel, a WI-FI direct transmission channel, a USB direct transmission channel, or a BLUETOOTH low energy transmission channel. The transmission channel supported by the watch 200 includes a BLUETOOTH transmission channel, a WI-FI direct transmission channel, or a BLUETOOTH low energy transmission channel. The watch 200 and the mobile phone 100 select a transmission channel jointly supported by both parties, that is, the transmission channel determined through negotiation includes the BLUETOOTH transmission channel, the WI-FI direct transmission channel, or the BLUETOOTH low energy transmission channel.

It should be noted that the mobile phone 100 and the watch 200 determine the supported transmission channel based on device capabilities. For example, if the mobile phone 100 and the watch 200 each have a USB interface and a USB-related component, it indicates that the mobile phone 100 and the watch 200 support a USB direct transmission channel. If the mobile phone 100 (or the watch 200) does not have a USB interface and a USB-related component, it indicates that the mobile phone 100 (or the watch 200) does not support a USB direct transmission channel, and the USB direct transmission channel cannot be established between the mobile phone 100 and the watch 200. In other words, the mobile phone 100 and the watch 200 do not support the USB direct transmission channel. In addition, if the mobile phone 100 and the watch 200 each have a USB interface and a USB-related component, and a USB connection is established between the mobile phone 100 and the watch 200 by using a USB data cable, it indicates that the USB direct transmission channel between the mobile phone 100 and the watch 200 is available. If no USB connection is established between the mobile phone 100 and the watch 200 by using a USB data cable, it indicates that the USB direct transmission channel between the mobile phone 100 and the watch 200 is currently unavailable. In addition, if the mobile phone 100 has a BLUETOOTH module, a BLUETOOTH low energy module, and a WI-FI communication module, it indicates that the mobile phone 100 supports a BLUETOOTH transmission channel, a BLUETOOTH low energy transmission channel, and a WI-FI transmission channel. If the watch 200 has a BLUETOOTH module, a BLUETOOTH low energy module, and a WI-FI communication module, it indicates that the watch 200 supports a BLUETOOTH transmission channel, a BLUETOOTH low energy transmission channel, and a WI-FI transmission channel. On the contrary, if at least one of the mobile phone 100 and the watch 200 does not have a BLUETOOTH communication module, it indicates that the mobile phone 100 and the watch 200 do not support a BLUETOOTH transmission channel. This is also the case for determining another transmission channel. Details are not described herein again.

TABLE 1

| Transmission channel | Mobile phone 100 | Watch 200 |
|---|---|---|
| WI-FI direct | Supported | Supported |
| USB direct | Supported | Not supported |
| BLUETOOTH | Supported | Supported |
| BLUETOOTH low energy | Supported | Supported |

In addition, the watch 200 and the mobile phone 100 negotiate a transmission channel. The two may simultaneously determine a transmission channel, or the watch 200 notifies the mobile phone 100 of a transmission channel supported by the watch 200, the mobile phone 100 determines, based on a transmission channel supported by the mobile phone 100 and the transmission channel supported by the watch 200, a transmission channel supported by the mobile phone 100 and the watch 200, and then the mobile phone 100 notifies the watch 200 of the determined transmission channel. Alternatively, the mobile phone 100 may notify the watch 200 of a transmission channel supported by the mobile phone 100, the watch 200 determines, based on a transmission channel supported by the watch 200 and the transmission channel supported by the mobile phone 100, a transmission channel supported by the watch 200 and the mobile phone 100, and then the watch 200 notifies the mobile phone 100 of the determined transmission channel.

In another implementation of this disclosure, a process of negotiating a transmission channel between the watch 200 and the mobile phone 100 may alternatively be as follows. The watch 200 sends device data of the watch 200 to the mobile phone 100 through the BLUETOOTH low energy transmission channel. The mobile phone 100 may determine, based on the device data of the watch 200, a transmission channel supported by the watch 200, and the mobile phone 100 may determine, based on the device data of the mobile phone 100, a transmission channel supported by the mobile phone 100, to determine a transmission channel both supported by the mobile phone 100 and the watch 200 as a transmission channel determined through negotiation. The device data is data indicating a device capability of the device, for example, may be data indicating whether USB interface and USB-related component information is available, and data indicating whether data of a BLUETOOTH module, a BLUETOOTH low energy module, and a WI-FI communication module is available.

After the mobile phone 100 and the watch 200 determine, through negotiation, the transmission channel supported by the mobile phone 100 and the watch 200, the method further includes determining a characteristic of each transmission channel.

Different transmission channels have different channel characteristics, which may be further reflected in a plurality of aspects such as a bandwidth size, a power consumption overhead, a channel response speed, a transmission delay, and connection reliability. The channel characteristic includes but is not limited to a power consumption characteristic, a bandwidth characteristic, a channel response speed characteristic, a transmission delay characteristic, a connection reliability characteristic, and the like.

The transmission channels determined by the watch 200 and the mobile phone 100 through negotiation include a BLUETOOTH transmission channel, a WI-FI direct transmission channel, and a BLUETOOTH low energy transmission channel. Channel characteristics of the transmission channels may be shown in Table 2 below.

TABLE 2

| Transmission channel | Power consumption characteristic | Bandwidth characteristic | Channel response speed | Transmission delay | Connection reliability |
|---|---|---|---|---|---|
| WI-FI direct | High power consumption overhead | High bandwidth | High response speed | Long transmission delay | Common reliability |
| BLUETOOTH | Low power consumption overhead | Low bandwidth | Low response speed | Long transmission delay | Common reliability |
| BLUETOOTH low energy | Low power consumption overhead | Low bandwidth | Low response speed | Long transmission delay | Common reliability |

It should be noted that different network access data packets have different requirements on a transmission channel. The channel characteristic of the transmission channel shown in Table 2 includes, when a network access data packet is transmitted between the watch 200 and the mobile phone 100, the watch 200 and the mobile phone 100 determine a transmission channel that adapts to the network access data packet by using a transmission channel decision algorithm. The transmission channel decision algorithm is to aggregate targets with similar characteristics to achieve a classification objective. That is, the watch 200 and the mobile phone 100 may perform characteristic matching based on the characteristic of the network access data packet and the channel characteristic of the transmission channel by using the transmission channel decision algorithm, to determine a transmission channel corresponding to each network access data packet, so as to achieve an objective of determining a transmission channel adapted to the network access data packet.

For example, when only one characteristic of the channel characteristics shown in Table 2 is matched, for example, a network access data packet with a higher power consumption requirement may be classified into a transmission channel whose power consumption characteristic is a low power consumption overhead (that is, a higher power consumption gain), a network access data packet with a higher bandwidth requirement is classified into a transmission channel whose bandwidth characteristic is a high bandwidth (that is, a higher bandwidth gain), a network access data packet with a higher channel response speed requirement (that is, a higher channel response speed) is classified into a transmission channel whose channel response speed characteristic is a higher response speed (that is, a higher channel response speed gain), a network access data packet having a higher transmission delay requirement (that is, a smaller transmission delay) is classified into a transmission channel whose transmission delay characteristic is a smaller transmission delay (that is, a larger transmission delay gain), and a network access data packet having a higher connection reliability requirement (that is, better connection reliability) is classified into a transmission channel whose connection reliability characteristic is better connection reliability (that is, a larger connection reliability gain). When a plurality of characteristics is matched, a matching degree may be determined based on a plurality of matching results, and then a corresponding transmission channel is determined based on the matching degree. A process of matching the characteristic of the network access data packet with the channel characteristic of the transmission channel in Table 2 is described in detail in the following.

To better determine a transmission channel, these channel characteristics may be quantized.

The following provides a feasible example manner of quantizing a channel characteristic of a transmission channel.

After each channel characteristic is quantized, a number (for example, 0 to 10) within a specific range is used to represent a characteristic value. A larger number indicates a larger positive gain of the channel characteristic. The positive gain of the transmission channel means that user experience may be better (for example, faster network access) or power consumption of a device may be smaller. For the power consumption characteristic, lower power consumption of transmitting a network access data packet on the transmission channel indicates a larger positive gain, for the bandwidth characteristic, a larger transmission bandwidth supported by the transmission channel indicates a larger positive gain, for the channel response speed characteristic, a higher channel response speed when the transmission channel transmits a network access data packet indicates a larger positive gain, for the transmission delay characteristic, a smaller transmission delay when the transmission channel transmits a network access data packet indicates a larger positive gain, and for the connection reliability characteristic, a more stable channel (or a communication connection) of the transmission channel indicates a greater positive gain.

The following Table 3 is an example of quantized characteristic values of a group of channel characteristics.

TABLE 3

| Transmission channel | Power consumption characteristic | Bandwidth characteristic | Channel response speed | Transmission delay | Connection reliability |
|---|---|---|---|---|---|
| WI-FI direct | 2 | 8 | 8 | 5 | 5 |
| BLUETOOTH | 8 | 2 | 2 | 4 | 5 |
| BLUETOOTH low energy | 10 | 1 | 1 | 4 | 5 |

The foregoing example is merely a simplified quantized characteristic value determined based on a gain status of the channel characteristic, and is used to describe the channel characteristic of the transmission channel and how the channel characteristic is used in a transmission channel decision algorithm. In actual implementation, the channel characteristic may further include more characteristic types. In addition, the characteristic value may alternatively be a value in another range.

The characteristic value of the channel characteristic of the transmission channel shown in Table 3 is used to determine, when the watch 200 and the mobile phone 100 transmit a network access data packet, a transmission channel that adapts to the network access data packet. For example, characteristic matching may be performed based on the characteristic value of the network access data packet and the characteristic value of the transmission channel by using the transmission channel decision algorithm, so as to determine the transmission channel of each network access data packet. A process of matching the characteristic value of the network access data packet with the characteristic value of the channel characteristic of the transmission channel in Table 3 is described in detail in the following.

Still refer to FIG. 4A. After the watch 200 and the mobile phone 100 complete transmission channel negotiation and channel characteristic determining, the method further includes the following steps.

S25: The watch 200 and the mobile phone 100 perform link monitoring on a BLUETOOTH low energy link, to determine whether the BLUETOOTH low energy communication connection is maintained between the watch 200 and the mobile phone 100. If the BLUETOOTH low energy communication connection is maintained between the watch 200 and the mobile phone 100, subsequent transmission of the network access data packet may be performed, or if the communication connection is not maintained between the watch 200 and the mobile phone 100, transmission of the network access data packet may be terminated.

S26: The watch 200 creates a network interface card for a network proxy service virtual, and configures an IP routing table.

S27: The watch 200 implements port monitoring based on the IP routing table. The port herein may be a port that is configured in the IP routing table and includes a port through which a first network access data packet passes during network access. That is, the watch 200 sets a monitoring port in advance, and sets a forwarding rule of the first network access data packet by using the IP routing table, so that the first network access data packet is forwarded to a first network proxy service module after being filtered by the IP routing table.

FIG. 4A shows an example of a process in which the watch 200 and the mobile phone 100 discover each other, establish a connection, and negotiate a transmission channel. After step S27, if the watch 200 performs port monitoring and detects the first network access data packet, the watch 200 needs to access a network 300 by using the mobile phone 100.

When the watch 200 monitors the first network access data packet, the watch 200 accesses the network 300 by using the mobile phone 100. First, the watch 200 needs to determine a transmission channel of the first network access data packet based on a characteristic of the first network access data packet, so as to transmit the first network access data packet to the mobile phone 100. For a process in which the watch 200 accesses the network 300 by using the mobile phone 100, refer to FIG. 4D and FIG. 4E. An application of the watch 200 initiates networking, sends a TCP first network access data packet, or sends a UDP first network access data packet. A system kernel of the watch 200 forwards the first network access data packet to the first network proxy service module based on a routing rule of an IP router preset by the first network proxy service module. The first network proxy service module monitors the first network access data packet, analyzes a characteristic of the first network access data packet, and determines a transmission channel of the first network access data packet. The first network proxy service module forwards the first network access data packet to the mobile phone 100 based on the selected transmission channel. The mobile phone 100 forwards the first network access data packet to the network 300, and the network 300 returns a second network access data packet as a result to the mobile phone 100. The mobile phone 100 forwards the second network access data packet back to the first network proxy service module in the watch 200 through the selected transmission channel. The first network proxy service module in the watch 200 transmits the received second network access data packet back to the application.

Figure 4D:
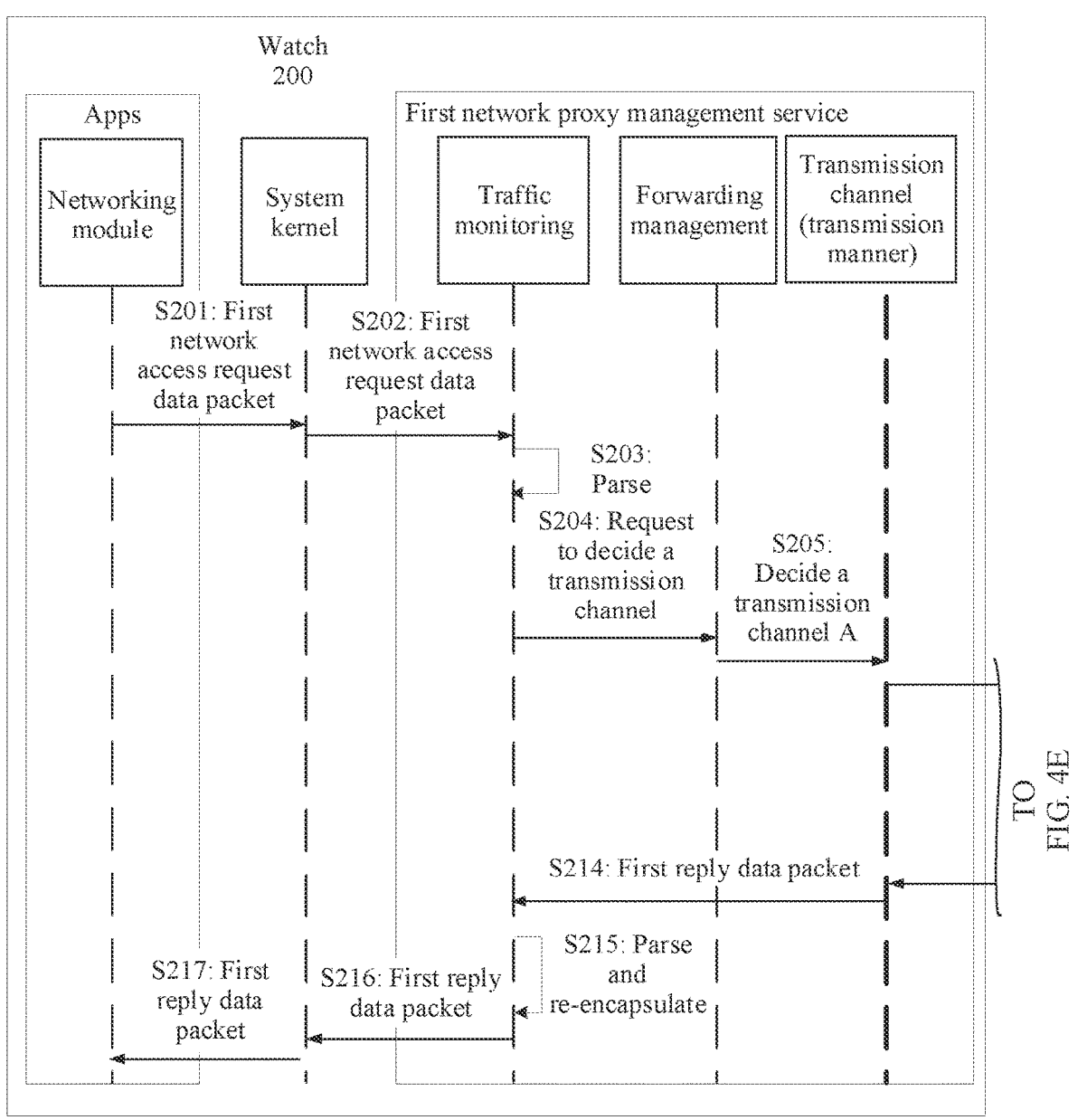
FIG. 4D and FIG. 4E are a schematic diagram of a proxy networking (surfing) process between a mobile phone and a watch according to some implementations of this disclosure.
Figure 4E:
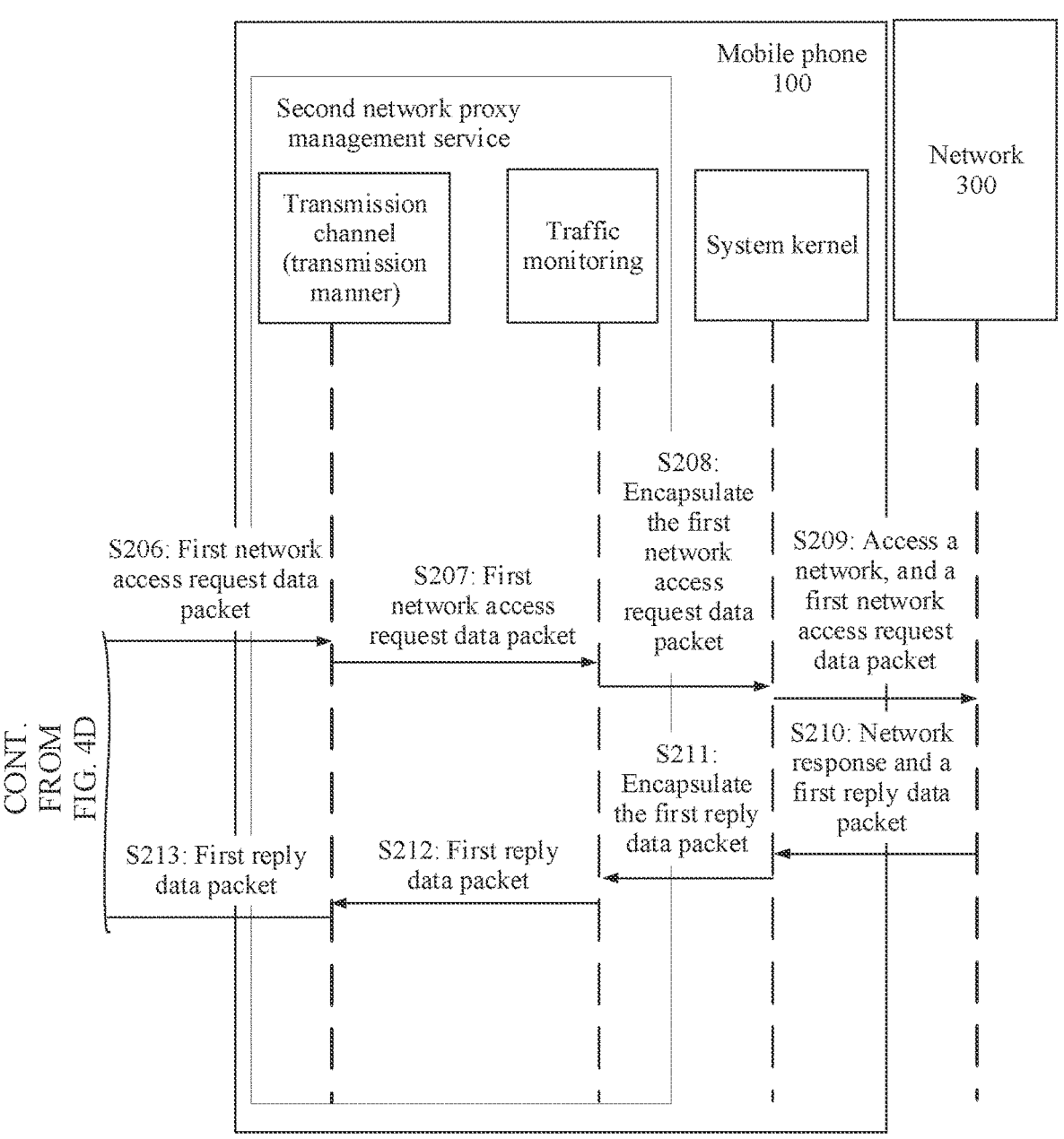

It should be noted that, in FIG. 4D and FIG. 4E, the application in the watch 200 may be a system application of the watch 200, or may be a third-party application. A function of the system kernel in the watch 200 may be implemented by the foregoing virtual network interface card for the network proxy service and IP routing table that run at an OS layer. The first network agent management service module may include a traffic monitoring module, a forwarding management module, and a transmission channel module based on a function of the first network agent management service module. In addition, the first network agent management service module in the mobile phone 100 may include a transmission channel module and a traffic monitoring module based on a function of the first network agent management service module. A function of the system kernel in the mobile phone 100 may be implemented by the foregoing WI-FI protocol stack or cellular protocol stack.

In this implementation, the first network access data packet may be a first network access request data packet, and the second network access data packet may be a first reply data packet.

A process in which the watch 200 accesses the network 300 by using the mobile phone 100 may include the following steps.

S201: A networking module of an application in the watch 200 initiates a request to a system kernel in the watch 200 to apply for a TCP or UDP socket, so as to send a first network access request data packet. The first network access request data packet includes a source IP address and port information, and a destination IP address and port information. The source IP address and port information are an IP address and port information of the first network agent management service module, and the destination IP address and port information is an IP address and port information of the network 300.

The networking module refers to a module used for a network function in an application. The networking module may apply for a socket by using an interface provided by the foregoing first network agent management service module, or may directly apply for a socket by using an interface provided by, for example, a Linux kernel. It should be noted that, no matter which manner the networking module applies for the socket, the network access data packet finally reaches the system kernel.

S202: The system kernel in the watch 200 forwards the first network access request data packet to the first network proxy management service module based on an IP routing table. The IP routing table may forward all data packets that use a loopback (lo) interface as an egress to the first network agent management service module, so that the first network agent management service module monitors a lo packet of the lo interface based on the socket.

S203: The traffic monitoring module in the first network proxy management service module in the watch 200 monitors a packet to obtain the first network access request data packet, and parses the packet to obtain networking information.

The networking information includes information such as a transmission protocol of the first network access request data packet, data frame information of the first network access request data packet, and quintuple information of the first network access request data packet.

S204: The traffic monitoring module sends the first network access request data packet to the forwarding management module, and requests the forwarding management module to decide a transmission channel.

S205: After receiving the first network access request data packet, the forwarding management module determines a transmission channel based on characteristic information of the first network access request data packet.

The characteristic information of the first network access request data packet may refer to information such as a transmission protocol of the first network access request data packet, data frame information of the first network access request data packet, and quintuple information of the first network access request data packet.

Determining the transmission channel based on the characteristic information of the first network access request data packet may be performing characteristic matching based on the characteristic of the first network access request data packet and the channel characteristic of the transmission channel by using a transmission channel decision algorithm, so as to determine a transmission channel corresponding to the first network access request data packet. A matching process is described in detail below.

It should be noted that, in this implementation, a BLUETOOTH low energy transmission channel is used as a default transmission channel and is always in an enabled state. Selecting the transmission channel may refer to selecting a transmission channel from the BLUETOOTH transmission channel and the WI-FI direct transmission channel as a transmission channel of the first network access request data packet.

If the watch 200 determines that the transmission channel corresponding to the first network access request data packet is a transmission channel A (the BLUETOOTH transmission channel), and in this case, if the watch 200 and the mobile phone 100 have enabled the transmission channel A, transmission channel switching does not need to be performed, and the first network access request data packet is transmitted by using the transmission channel A. If the transmission channel A is not enabled in this case, the watch 200 and the mobile phone 100 need to respectively enable the transmission channel A. After the transmission channel A is enabled, to avoid a waste of resources, a default transmission channel C in an idle state may be disabled.

That the watch 200 and the mobile phone 100 enable the transmission channel A includes the following. The watch 200 instructs, by using the default transmission channel C, the mobile phone 100 to enable the transmission channel A. After establishing a group in a BLUETOOTH mode, the mobile phone 100 sends group information thereof to the watch 200 by using the default transmission channel C. The watch 200 obtains the group information and establishes a mode connection to the mobile phone 100, that is, establishes the transmission channel A.

S206: The first network access request data packet is sent to the transmission channel A in the server device mobile phone 100 through the transmission channel A.

S207: The first network access request data packet received by the mobile phone 100 is forwarded to the traffic monitoring module through the transmission channel A in the mobile phone 100.

S208: The traffic monitoring module encapsulates the first network access request data packet, and forwards the encapsulated first network access request data packet to the system kernel.

S209: The system kernel accesses the network 300, and sends the first network access request data packet to the network 300.

S210: The network 300 makes a network response based on the received first network access request data packet, and sends a first reply data packet to the system kernel of the mobile phone 100.

S211: The system kernel in the mobile phone 100 encapsulates the first reply data packet, and sends the encapsulated first reply data packet to the traffic monitoring module.

S212: The traffic monitoring module sends the first reply data packet to the transmission channel A.

S213: The transmission channel A sends the first reply data packet to a port of the transmission channel A in the watch 200.

S214: The transmission channel A in the watch 200 sends the first reply data packet to the traffic monitoring module.

S215: The traffic monitoring module parses the first reply data packet to re-encapsulate.

S216: Forward the re-encapsulated first reply data packet to an actual network socket of the application in the system kernel, that is, a port used by the system application for applying for the socket in step S201.

S217: The system kernel sends the first reply data packet to the networking module in the application.

The system kernel may parse the first reply data packet, perform link matching by using information about the first reply data packet, information about the first data packet, a forwarding record, and the like, determine a service application corresponding to the first reply data packet, perform packet response, and send the first reply data packet to the networking module in the application.

In addition, for step S212, the mobile phone 100 may alternatively re-determine a transmission channel based on a characteristic of the first reply data packet, and transmit the first reply data packet based on the re-determined transmission channel.

After step S217, the method further includes the following. Disable the BLUETOOTH transmission channel.

If the mobile phone 100 determines, based on the first reply data packet, that the first reply data packet is a video network access data packet, a data frame is large, and a transmission channel B (that is, a WI-FI direct transmission channel) needs to be used for transmission, the WI-FI direct transmission channel is enabled between the mobile phone 100 and the watch 200 to transmit the reply data packet. In addition, after step S217, the method further includes the following. Disable the WI-FI direct transmission channel.

The following explains and describes a process of determining, by using the transmission channel decision algorithm, the transmission channel corresponding to the network access data packet.

It should be noted that different network access data packets have different requirements on a transmission channel. During transmission of a network access data packet, the watch 200 and the mobile phone 100 may perform characteristic matching based on a characteristic of the network access data packet and a channel characteristic of the transmission channel by using the transmission channel decision algorithm, to determine a transmission channel of each network access data. The purpose of the transmission channel decision algorithm is to classify network access data packets based on characteristics to transmission channels that better meet these characteristics.

The characteristic of the network access data packet and a process of determining the characteristic are explained as follows.

To implement comparison between a plurality of characteristics, the characteristic of the network access data packet may be normalized and summarized into a requirement (or a channel requirement) of the network access data packet for a transmission channel.

First, various factors that affect the characteristic of the network access data packet are proposed, for example, including but not limited to: protocol type, quintuple, and data frame size.

For the protocol type, different protocol types have different requirements for the transmission channel. For example, an FTP requires a higher bandwidth for the transmission channel, whereas a DNS protocol requires a transmission channel with lower power consumption because it is frequently used.

The quintuple is a source IP address, a source port, a destination IP address, a destination port, and a transport layer protocol. The purpose of the network access data packet can be deduced by using the quintuple, for example, a specific service and scenario of the network access data packet can be deduced, and a requirement of the network access data packet on the transmission channel can be deduced.

The specific service and scenario of the network access data packet may be deduced based on the destination IP address and the destination port, for example, as follows.

The destination address of the network access data packet is a destination IP address of a live broadcast platform, and the transport layer protocol is an RTP. It may be deduced that the network access data packet may be used for streaming media playback, and therefore it is deduced that the network access data packet may require a low transmission delay and high connection reliability.

For another example, if a number of the destination port is 53 and the transport layer protocol is a UDP protocol, it may be deduced that the network access data packet is used for a DNS service. Therefore, it can be learned that the network access data packet does not have a high requirement on bandwidth, a transmission delay, and the like, but the network access data packet is transmitted frequently, and has a high requirement on power consumption.

It should be noted that, the quintuple is an empirical determining manner used to comprehensively determine the purpose of the network access data packet. Sometimes, only one or two numbers in the quintuple are required to know the specific purpose of the network access data packet. In some other cases, the quintuple may not help to deduce the specific purpose of the network access data packet. In this case, the purpose of the network access data packet may need to be determined according to other conditions, for example, the data frame size.

The data frame size is a number of bytes occupied by a network access data packet. For example, a larger data frame requires higher bandwidth of a transmission channel.

For example, Table 4.1 lists requirements on power consumption, bandwidth, channel response speed, transmission delay, and connection reliability for network access data packets of different protocol types.

TABLE 4.1

| Characteristic of a network access data packet | Power consumption requirement | Bandwidth requirement | Channel response speed requirement | Transmission delay requirement | Connection reliability requirement |
|---|---|---|---|---|---|
| DNS protocol | High | Low | Low | Low | Low |
| FTP protocol | Low | High | High | High | High |

TABLE 4.1-continued

| Characteristic of a network access data packet | Power consumption requirement | Bandwidth requirement | Channel response speed requirement | Transmission delay requirement | Connection reliability requirement |
|---|---|---|---|---|---|
| RTP protocol | High | High | High | High | High |
| HTTP protocol | Low | Low | Low | Low | Low |

For example, Table 4.2 lists requirements on power consumption, bandwidth, channel response speed, transmission delay, and connection reliability for network access data packets of different data frame sizes.

TABLE 4.2

| Characteristic of a network access data packet | Power consumption requirement | Bandwidth requirement | Channel response speed requirement | Transmission delay requirement | Connection reliability requirement |
|---|---|---|---|---|---|
| Data frame ≥ 100 bytes | Low | High | Low | Low | Low |
| Data frame < 100 bytes | Low | Low | Low | Low | Low |

For example, Table 4.3 lists requirements on power consumption, bandwidth, channel response speed, transmission delay, and connection reliability for network access data packets of different service types.

TABLE 4.3

| Characteristic of a network access data packet | Power consumption Requirement | Bandwidth Requirement | Channel response speed Requirement | Transmission delay requirement | Connection reliability Requirement |
|---|---|---|---|---|---|
| Streaming media service | High | High | Low | Low | High |
| DNS service | High | Low | Low | Low | Low |

For the characteristic of the network access data packet and the channel characteristic of the transmission channel, a transmission channel used by the network access data packet is determined by using a transmission channel decision algorithm. The following explains a decision process of the transmission channel decision algorithm.

During transmission of the network access data packet, the network access data packet may be analyzed to determine the characteristic of the network access data packet, for example, determine the characteristic such as a protocol type, a data frame size, or a service type of the network access data packet. Then, channel requirements such as a power consumption requirement, a bandwidth requirement, a channel response speed requirement, a transmission delay requirement, and a connection reliability requirement corresponding to the network access data packet are determined based on a correspondence between the characteristic of the network access data packet and the channel requirement shown in Table 4.1 to Table 4.3. Then, characteristic matching is performed between the channel requirement shown in Table 4.1 to Table 4.3 and the channel characteristic of each transmission channel shown in Table 2, for example, matching between the power consumption requirement and the power consumption characteristic, and matching between the bandwidth requirement and the bandwidth characteristic, so as to determine the transmission channel corresponding to the network access data packet as a transmission channel for transmitting the network access data packet.

It should be noted that, during characteristic matching, matching of the power consumption, bandwidth, channel response speed, transmission delay, and connection reliability may be respectively performed based on Table 4.1 to Table 4.3 and Table 2, and a transmission channel with a highest matching degree may be determined as the transmission channel of the network access data packet. For example, in an implementation of this disclosure, a network access data packet of a DNS protocol type is used as an example. Matching is performed between a channel requirement and a channel characteristic of a BLUETOOTH transmission channel based on Table 4.1 and Table 2. When four items: the bandwidth, the channel response speed, the transmission delay, and the connection reliability are matched, and power consumption is mismatched, the matching degree of the transmission channel may be considered as 4. Matching is performed between a channel requirement and a channel characteristic of a WI-FI direct transmission channel. When three items: the power consumption, the transmission delay, and the connection reliability are matched, and the bandwidth and the channel response speed are mismatched, the matching degree of the transmission channel may be considered as 3. In this case, it may be determined that a transmission channel corresponding to the network access data packet of the DNS protocol type is the BLUETOOTH transmission channel.

During characteristic matching, several items may be selected from the power consumption, bandwidth, channel response speed, transmission delay, and connection reliability to perform characteristic matching. In a transmission process, different types of network access data packets have different requirements for a transmission channel. For example, in an implementation of this disclosure, selection may be performed based on a factor (that is, a channel requirement) that is more concerned about transmission of the network access data packet. For example, if the transmission of the network access data packet focuses more on the power consumption and bandwidth, only power consumption matching and bandwidth matching may be performed. If the transmission of the network access data packet focuses more on the channel response speed and connection reliability, only channel response speed matching and connection reliability matching may be performed.

In addition, when characteristic matching is performed, a matching sequence may be selected according to a requirement. For example, in an implementation of this disclosure, the matching sequence may be determined based on a factor that is more concerned about transmission of the network access data packet. For example, if transmission of the network access data packet is more concerned about the power consumption, power consumption matching is performed first, and then bandwidth matching is performed. If transmission of the network access data packet is more concerned about the channel response speed, channel response speed matching may be performed first, and then transmission delay matching is performed.

For example, if the protocol type of the network access data packet is a DNS protocol type, and the transmission of the network access data packet focuses more on the power consumption and bandwidth, only power consumption matching and bandwidth matching may be performed. It can be learned from Table 4.1 that the power consumption requirement of the network access data packet of the DNS protocol type is high, and the bandwidth requirement is low. The power consumption requirement may be first matched with the power consumption characteristic in Table 2. It can be learned from the foregoing that a network access data packet having a higher power consumption requirement needs to be classified into a transmission channel whose power consumption characteristic is a low power consumption overhead (that is, a larger power consumption gain), a transmission channel that meets the power consumption requirement in the BLUETOOTH transmission channel and the WI-FI direct transmission channel is the BLUETOOTH transmission channel. In this case, it may be determined that a transmission channel corresponding to the network access data packet of the DNS protocol type is the BLUETOOTH transmission channel.

After the power consumption characteristic and the power consumption characteristic are matched, the bandwidth requirement and the bandwidth characteristic may be further matched, and the network access data packet having a low bandwidth requirement is classified into a transmission channel whose bandwidth characteristic is a small bandwidth (that is, a smaller bandwidth gain), a transmission channel that meets the bandwidth requirement in the BLUETOOTH transmission channel and the WI-FI direct transmission channel is a BLUETOOTH transmission channel. In this case, it may alternatively be determined that a transmission channel corresponding to the network access data packet of the DNS protocol type is a BLUETOOTH transmission channel.

For the foregoing step S205, that the forwarding management module determines the transmission channel based on the characteristic information of the first network access data packet may be as follows. If the first network access data packet is a data packet of a DNS protocol type, determine, based on the foregoing process, that a transmission channel that better meets a channel requirement of the first network access data packet is the BLUETOOTH transmission channel.

Further, to implement quantized comparison between a plurality of characteristics instead of simple daily experience determining, a channel requirement (or a data packet influencing factor) corresponding to a characteristic of the network access data packet may be quantized, and summarized to a requirement of the network access data packet for each quantized characteristic value of the transmission channel through normalization.

Similar to a method for quantizing a transmission channel characteristic, a solution for quantizing a channel requirement is as follows.

A channel requirement of each type of network access data packet is represented by a number within a specific range (for example, 0 to 10). A larger number indicates a large positive requirement (or a higher positive requirement) on a transmission channel when the network access data packet is transmitted. The positive requirement on the transmission channel means that user experience may be better (for example, faster network access) or a power consumption requirement of a device may be smaller. For the power consumption requirement, a higher power consumption requirement (that is, lower power consumption) during transmission of the network access data packet indicates a higher positive requirement, for the bandwidth requirement, a higher bandwidth requirement during transmission of the network access data packet indicates a higher positive requirement, for the channel response speed requirement, a higher channel response speed requirement during transmission of the network access data packet indicates a higher positive requirement, for the transmission delay requirement, a lower transmission delay requirement during transmission of the network access data packet indicates a higher positive requirement, and for the connection reliability requirement, a higher requirement on connection stability (that is, a more stable connection) during transmission of the network access data packet indicates a higher positive requirement.

When the transmission channel decision algorithm is used to determine which transmission channel is used by the network access data packet, a transmission channel that better meets a channel requirement of the network access data packet is matched for the network access data packet. For example, a transmission channel with a large positive gain is matched for a network access data packet with a large positive requirement, that is, a transmission channel with a large power consumption gain is matched for a network access data packet with a high power consumption requirement, a transmission channel with a large bandwidth gain is matched for a network access data packet with a higher response speed, a transmission channel with a larger transmission delay gain is matched for a network access data packet with a larger transmission delay requirement, and a transmission channel with a larger connection reliability gain is matched for a network access data packet with a higher connection reliability requirement.

For example, Table 5.1 lists quantized results on requirements of power consumption, bandwidth, channel response speed, transmission delay, and connection reliability for network access data packets of different protocol types.

TABLE 5.1

| Characteristic of a network access data packet | Power consumption Requirement | Bandwidth Requirement | Channel response speed Requirement | Transmission delay requirement | Connection reliability Requirement |
|---|---|---|---|---|---|
| DNS protocol | 8 | 1 | 1 | 1 | 1 |
| FTP protocol | 2 | 9 | 8 | 6 | 8 |
| RTP protocol | 8 | 8 | 8 | 8 | 8 |
| HTTP protocol | 2 | 4 | 1 | 1 | 1 |

For example, Table 5.2 lists quantized results on requirements of power consumption, bandwidth, channel response speed, transmission delay, and connection reliability for network access data packets of different data frame sizes.

TABLE 5.2

| Characteristic of a network access data packet | Power consumption Requirement | Bandwidth Requirement | Channel response speed Requirement | Transmission delay requirement | Connection reliability Requirement |
|---|---|---|---|---|---|
| Data frame ≥ 100 bytes | 5 | 9 | 5 | 5 | 5 |
| Data frame < 100 bytes | 5 | 1 | 5 | 5 | 5 |

For example, Table 5.3 lists quantized results on requirements of power consumption, bandwidth, channel response speed, transmission delay, and connection reliability for network access data packets of different service types.

TABLE 5.3

| Characteristic of a network access data packet | Power consumption Requirement | Bandwidth Requirement | Channel response speed Requirement | Transmission delay requirement | Connection reliability Requirement |
|---|---|---|---|---|---|
| Streaming media service | 9 | 9 | 2 | 1 | 7 |
| | 9 | 1 | 1 | 1 | 2 |

The foregoing example is merely a simplified result of quantizing the characteristic of the network access data packet, and is used to describe how the characteristic of the network access data packet is used in the transmission channel decision algorithm.

In a possible implementation of this disclosure, the transmission channel decision algorithm may be: comparing the characteristic values of the channel requirements of the network access data packet shown in Table 5.1 to Table 5.3 with the characteristic values of the channel characteristics of the transmission channels shown in Table 3, and selecting a transmission channel that is more suitable for the network access data packet.

When characteristic matching is performed based on Table 5.1 to Table 5.3 and Table 3, a matching degree may be reflected based on an absolute value of a difference between corresponding characteristic values. For the power consumption characteristic and the power consumption requirement, a larger absolute value of a difference between the characteristic value of the power consumption characteristic and the characteristic value of the power consumption requirement indicates more matching (that is, a higher matching degree). For the transmission delay characteristic and the transmission delay requirement, a larger absolute value of a difference between the characteristic value of the transmission delay and the characteristic value of the transmission delay requirement indicates more matching. For a characteristic value of another channel characteristic and a characteristic value of a channel requirement of the network access data packet, a smaller absolute value of a difference between the characteristic values indicates more matching between the characteristic values.

It should be noted that, compared with the characteristic matching performed based on Table 5.1 to Table 5.3 and Table 3, the characteristic matching performed based on Table 4.1 to Table 4.3 and Table 2 is different. The only difference is that characteristic value comparison is performed, and the items selected for matching and the matching sequence may be described above, and details are not described herein again.

For example, for the foregoing step S205, that the forwarding management module determines the transmission channel based on the characteristic information of the first network access data packet may be as follows. If the first network access data packet is a data packet of a DNS protocol type, the forwarding management module further determines, based on Table 5.1, a channel requirement of the first network access data packet for the transmission channel as follows. If the characteristic value of the power consumption requirement is 8, the characteristic value of the bandwidth requirement is 1, the characteristic value of the channel response speed requirement is 1, the characteristic value of the transmission delay requirement is 1, and the characteristic value of the connection reliability requirement is 1, it indicates that transmission power consumption of the first network access data is high, and the first network access data is applicable to transmission through a transmission channel with a low power consumption overhead, to reduce power consumption.

An absolute value of a difference between the characteristic value of the channel requirement of the first network access data packet and a characteristic value of each channel characteristic of the BLUETOOTH transmission channel and the WI-FI direct transmission channel is shown in Table 6.

TABLE 6

| | Power consumption (Absolute value) | Bandwidth (Absolute value) | Channel response speed (Absolute value) | Transmission delay (Absolute value) | Connection reliability (Absolute value) |
|---|---|---|---|---|---|
| WI-FI direct | 6 | 7 | 7 | 4 | 4 |
| BLUETOOTH | 0 | 1 | 1 | 3 | 4 |

It can be learned that, the absolute value corresponding to the power consumption of the BLUETOOTH transmission channel and the absolute value corresponding to the transmission delay are smaller, and the absolute value corresponding to the bandwidth of the BLUETOOTH transmission channel and the absolute value corresponding to the channel response speed are smaller. This indicates that the BLUETOOTH transmission channel matches the first network access data packet more, that is, the transmission channel corresponding to the first network access data packet is the BLUETOOTH transmission channel.

In a possible implementation of this disclosure, a channel requirement of the network access data packet may be sequentially matched with a channel characteristic, to determine a corresponding transmission channel.

Figure 5:
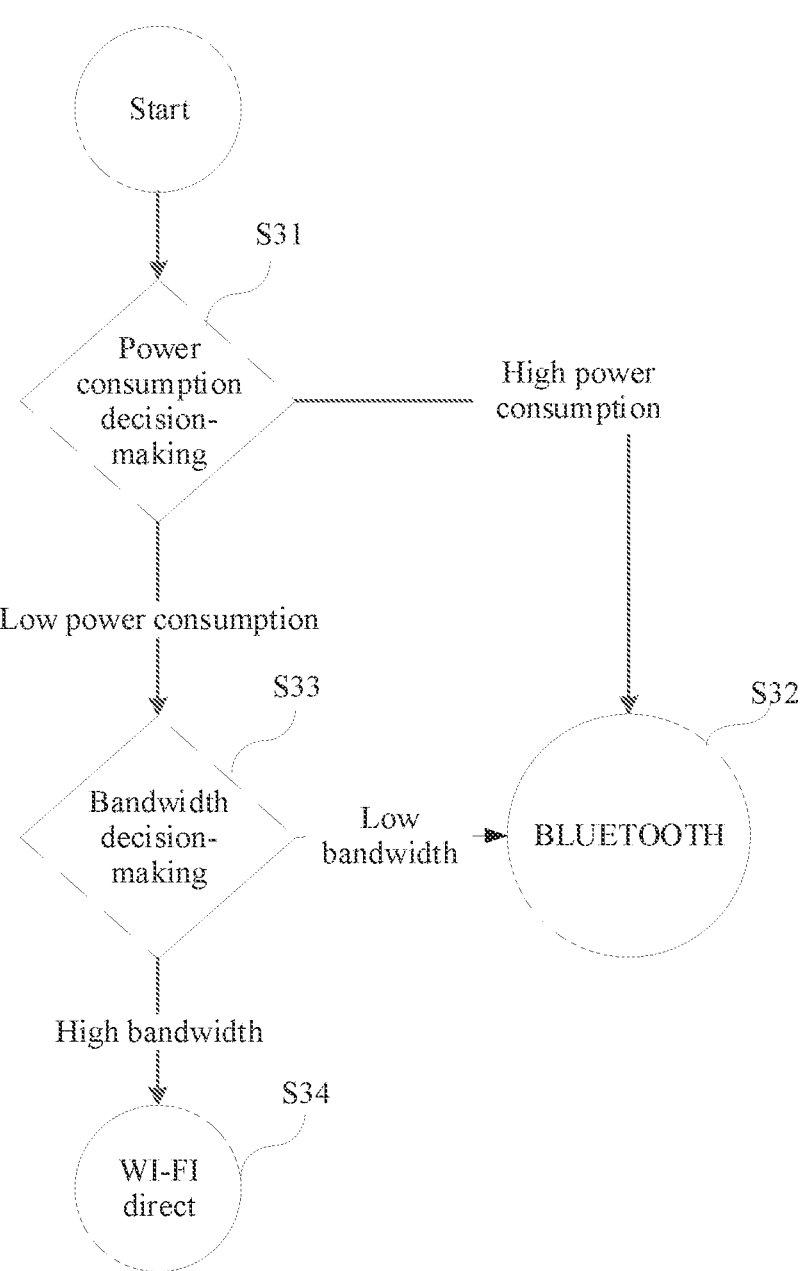
FIG. 5 is a schematic diagram of a process of determining a transmission channel according to some implementations of this disclosure.

For ease of understanding, the following provides a classification instance with only two channel characteristics. It is assumed that the channel characteristics include only the power consumption characteristic and the bandwidth characteristic. As shown in FIG. 5, a process of determining a transmission channel corresponding to a network access data packet may include the following steps.

S31: The watch 200 makes a power consumption decision-making, determines whether transmission of a network access data packet has high power consumption, and if the transmission has high power consumption, perform step S32, or if the transmission does not have high power consumption, but has low power consumption, perform step S33.

Whether the transmission of the network access data packet has high power consumption may be determined based on whether a quantized value of the power consumption requirement of the network access data packet shown in Table 5 is greater than 5. If the quantized value is greater than 5, it is considered that the transmission has low power consumption, or if the quantized value is less than or equal to 5, it is considered that the transmission has high power consumption.

S32: The watch 200 selects a BLUETOOTH transmission channel to transmit the network access data packet.

S33: The watch 200 performs bandwidth decision-making. If the network access data packet requires a high-bandwidth transmission channel, perform step S34, or if the network access data packet does not require a high-bandwidth transmission channel, and requires only a low-bandwidth transmission channel, perform step S32.

Whether the network access data packet requires a high-bandwidth transmission channel may be determined based on whether the quantized value of the bandwidth requirement characteristic of the network access data packet shown in Table 5 is greater than 5. If the quantized value is greater than 5, it is considered that the high-bandwidth transmission channel is required, or if the quantized value is less than or equal to 5, it is considered that the high-bandwidth transmission channel is not required.

S34: The watch 200 selects a WI-FI direct transmission channel to transmit the network access data packet.

An advantage of this implementation lies in that a decision implementation process is simple, and a decision on a transmission channel can be implemented by defining each decision point and a decision value as required. In addition, when a number of decision points is small, classification performance can be high.

In step S31, it is determined whether transmission of the network access data packet has high power consumption. A characteristic of the network access data packet may be first determined, and then whether the network access data packet has high power consumption is determined based on the power consumption requirement of the network access data packet shown in Table 4.1 to Table 4.3. In step S33, it is determined whether a large-bandwidth transmission channel is required for transmission of the network access data packet. A characteristic of the network access data packet may be first determined, and then whether the network access data packet requires a large-bandwidth transmission channel is determined based on a bandwidth requirement of the network access data packet shown in Table 4.

In addition, another decision manner may alternatively be used. For example, a bandwidth decision-making may be made first, and then a power consumption decision-making is made. Alternatively, another transmission channel decision algorithm may be used, for example, a delay requirement decision is made first, and then a channel response speed decision is made, so as to select and determine a transmission channel of the network access data packet according to a requirement.

Table 7.1 shows a correspondence between network access data packets of different protocol types and transmission channels. In some implementations of this disclosure, after a characteristic of the network access data packet is determined, a transmission channel corresponding to the network access data packet may be directly determined according to Table 7.1.

TABLE 7.1

| Characteristic of a network access data packet | Transmission channel |
|---|---|
| DNS protocol | BLUETOOTH |
| FTP protocol | WI-FI direct |
| RTP protocol | WI-FI direct |
| HTTP protocol | BLUETOOTH |

For example, Table 7.2 shows a correspondence between some network access data packets of different data frame sizes and transmission channels. In some implementations of this disclosure, after a characteristic of the network access data packet is determined, a transmission channel corresponding to the network access data packet may be directly determined according to Table 7.2.

TABLE 7.2

| Characteristic of a network access data packet | Transmission channel |
| --- | --- |
| Data frame ≥ 100 bytes | WI-FI direct |
| Data frame < 100 bytes | BLUETOOTH |

For example, Table 7.3 shows a correspondence between some network access data packets of different data frame sizes and transmission channels. In some implementations of this disclosure, after a characteristic of the network access data packet is determined, a transmission channel corresponding to the network access data packet may be directly determined according to Table 7.3.

TABLE 7.3

| Characteristic of a network access data packet | Transmission channel |
| --- | --- |
| Streaming media service | WI-FI direct |
| DNS service | WI-FI direct |

In this disclosure, the service type corresponding to the network access data packet may be determined based on the protocol type of the network access data packet. For example, if the protocol type of the network access data packet is a DNS protocol, the service type corresponding to the network access data packet is a DNS service. In addition, the service type of the network access data packet may be determined based on quintuple information of the network access data packet. For example, a number of a destination port of the network access data packet is 53, and a transport layer protocol is a UDP protocol. It may be deduced that the network access data packet is used for the DNS service, that is, the service type of the network access data packet is the DNS service.

The correspondence between the network access data packet and the transmission channel shown in Table 7.1 to Table 7.3 may be obtained by matching a channel requirement of the network access data packet with a channel characteristic of the transmission channel, or may be obtained based on an absolute value of a difference between a characteristic value of the channel requirement of the network access data packet and a characteristic value of the channel characteristic of the transmission channel.

For example, for the foregoing step S205, that the forwarding management module determines the transmission channel based on the characteristic information of the first network access data packet may be as follows. If the first network access data packet is a data packet of a DNS protocol type, determine that the first network access data packet is a DNS protocol type data packet, and further determine, based on Table 7.1, that the transmission channel corresponding to the first network access data packet is a BLUETOOTH transmission channel, that is more compliant with a channel requirement of the first network access data packet.

It should be noted that a process of determining a transmission channel corresponding to each network access data packet is the same as the foregoing process of determining a transmission channel corresponding to the first network access data packet.

Certainly, in some other implementations of this disclosure, a transmission channel selection neural network model may be established. The transmission channel selection neural network model may determine, based on a characteristic of a network access data packet, a transmission channel corresponding to the network access data packet. A prediction policy of the transmission channel selection neural network model may be obtained by performing machine learning and training based on a correspondence between several network access data packets and the transmission channel. Details are not described in this disclosure.

In some other implementations of this disclosure, the transmission channels determined by the watch 200 and the mobile phone 100 through negotiation may include a BLUETOOTH transmission channel and a WI-FI direct transmission channel. In addition, it may be determined that the BLUETOOTH transmission channel is used as a default transmission channel between devices, and the BLUETOOTH transmission channel is kept in an enabled state. When the watch 200 accesses the network by using the mobile phone 100, the watch 200 and the mobile phone 100 may negotiate, based on a characteristic of a network access data packet, a transmission channel to transmit each network access data packet by using the BLUETOOTH transmission channel.

The following are some typical scenarios in actual use of a user, and examples of a process of determining a transmission channel and transmitting a network access data packet in these scenarios. It is assumed that in this case, there are two transmission channels between a client device (the watch 200) and a server device (the mobile phone 100): a BLUETOOTH transmission channel and a WI-FI direct transmission channel. Based on Table 2, it may be specified that channel characteristics of the BLUETOOTH transmission channel and the transmission channel of the WI-FI direct transmission channel are shown in Table 8.

TABLE 8

| Transmission channel | Power consumption characteristic | Bandwidth characteristic |
| --- | --- | --- |
| BLUETOOTH | Low power consumption overhead | Low bandwidth |
| WI-FI direct | High power consumption overhead | High bandwidth |

The following provides some examples of determining a transmission channel and transmitting a network access data packet in different scenarios.

Scenario 1:

At a moment, the user uses the watch 200 to view weather, and a weather application in the watch 200 sends a network access data packet. After the watch 200 detects the network access data packet, the watch 200 determines a characteristic of the network access data packet and determines a transmission channel.

That the watch 200 determines a characteristic of the network access data packet may be as follows. The watch 200 determines a protocol type of the network access data packet when the user views the weather, and if the network access data packet is updated by using an HTTP, the watch 200 determines that the protocol type of the network access data packet is an HTTP protocol type. The watch 200 determines, based on the foregoing Table 4.1, that a channel requirement of the network access data packet when the user views the weather is a low power consumption requirement (transmission of the network access data packet is expected to consume traffic of about 1 kilobit (kb)) and a low bandwidth requirement (that is, the network access data packet of this type is insensitive to bandwidth).

That the watch 200 determines a transmission channel may be as follows. The watch 200 matches a channel requirement of the network access data packet with a characteristic of the transmission channel shown in Table 8, determines that the channel characteristic is a low power consumption overhead, and uses a low-bandwidth BLUETOOTH transmission channel as a transmission channel of the network access data packet.

In this case, because the BLUETOOTH transmission channel is already enabled, the watch 200 may directly transmit the network access data packet by using the BLUETOOTH transmission channel.

In another implementation, after determining that the protocol type of the network access data packet is the HTTP protocol type, the watch 200 may further directly determine, based on Table 7.1, that the transmission channel corresponding to the network access data packet is the BLUETOOTH transmission channel.

Scenario 2:

The watch 200 system downloads an offline map network access data packet for navigation. A map application in the watch 200 sends a network access data packet. After the watch 200 detects the network access data packet, the watch 200 determines a characteristic of the network access data packet and determines a transmission channel.

That the watch 200 determines a characteristic of the network access data packet may be as follows. If the watch 200 determines that the network access data packet uses an FTP protocol to download an offline map, the watch 200 determines that a protocol type of the network access data packet is an FTP protocol type. The watch 200 determines, based on Table 4.1, that a channel requirement for downloading a network access data packet of the offline map is a low power consumption requirement and a high bandwidth requirement.

That the watch 200 determines a transmission channel may be as follows. The watch 200 matches a channel requirement of the network access data packet with a channel characteristic of the transmission channel shown in Table 8, and first performs bandwidth matching, to use a WI-FI direct transmission channel whose channel characteristic is a high power consumption overhead and high bandwidth as the transmission channel.

After the watch 200 determines the transmission channel, the watch 200 and the mobile phone 100 may enable the WI-FI direct transmission channel to transmit the network access data packet, and after the transmission is completed, disable the WI-FI direct transmission channel.

In another implementation, after determining that the protocol type of the network access data packet is the FTP protocol type, the watch 200 may further directly determine, based on Table 7, that the transmission channel corresponding to the network access data packet is the WI-FI direct transmission channel.

Scenario 3:

A WECHAT is installed on the watch 200, and the WECHAT needs to interact with the network 300 to check whether there is a new unread message at a scheduled time. WECHAT in the watch 200 checks whether there is an update, and WECHAT sends a network access data packet. After the watch 200 detects the network access data packet, the watch 200 determines a characteristic of the network access data packet and determines a transmission channel.

That the watch 200 determines a characteristic of the network access data packet may be as follows. The watch 200 determines that a data frame size of the network access data packet for interacting with the network 300 by WECHAT to check whether there is a new unread message is 20 bytes at a scheduled time, and the watch 200 determines, based on Table 4.2, that a channel requirement of the network access data packet is a low bandwidth requirement.

That the watch 200 determines a transmission channel may be as follows. The watch 200 matches the characteristic of the network access data packet with the characteristic of the transmission channel shown in Table 8, determines that the channel characteristic is a low power consumption overhead, and uses a low-bandwidth BLUETOOTH transmission channel as the transmission channel. In this scenario, the power consumption overhead of the BLUETOOTH transmission channel is the smallest. Although the bandwidth is low, experience in this scenario is not affected. Therefore, the BLUETOOTH transmission channel is selected.

In this case, because the BLUETOOTH transmission channel is already enabled, the watch 200 may directly transmit the network access data packet by using the BLUETOOTH transmission channel.

In another implementation, after determining the data frame size of the network access data packet, the watch 200 may further directly determine, based on Table 7.2, that the transmission channel corresponding to the network access data packet is the BLUETOOTH transmission channel.

Scenario 4:

The watch 200 downloads and updates an installation upgrade package. A system of the watch 200 sends a network access data packet for updating the installation upgrade package. After the watch 200 detects the network access data packet, the watch 200 determines a characteristic of the network access data packet and determines a transmission channel.

That the watch 200 determines a characteristic of the network access data packet may be that the watch 200 determines that a protocol type of the network access data packet for downloading and updating the installation upgrade package is an FTP protocol type. In the determining manner in the foregoing scenario 1, it may be determined that a transmission channel corresponding to the network access data packet is a WI-FI direct transmission channel.

In addition, it should be noted that, data is downloaded by using the network access data packet of the FTP protocol type. Generally, transmission characteristics of the network access data packet are a low frequency and a high bandwidth, and the transmission channel is released after being used for a short time. In this scenario, the WI-FI direct transmission channel may provide a higher bandwidth. Although power consumption caused by the WI-FI direct transmission is high, the transmission channel may be disabled after the upgrade package is downloaded and updated, and the WI-FI direct transmission is maintained for a short time. Therefore, the WI-FI direct transmission channel is selected.

After the watch 200 determines the transmission channel, the watch 200 and the mobile phone 100 may enable the WI-FI direct transmission channel to transmit the network access data packet, and after the transmission is completed, disable the WI-FI direct transmission channel.

Scenario 5:

The watch 200 plays a live video by using live broadcast software. The live broadcast software of the watch 200 sends a network access data packet for updating an installation upgrade package. After the watch 200 detects the network access data packet, the watch 200 determines a characteristic of the network access data packet and determines a transmission channel.

That the watch 200 determines a characteristic of the network access data packet may be as follows. The watch

200 determines that the live broadcast software transmits the network access data packet of the live video by using an RTP protocol. In this case, in the determining manner in the foregoing scenario 1, it may be determined that the transmission channel corresponding to the network access data packet is a WI-FI direct transmission channel.

In addition, it should be noted that the network access data packet is relatively large, and a transmission result is not ensured. When a packet loss occurs, live broadcast frame freezing occurs. In addition, the network access data packet also requires a relatively high transmission delay, and the WI-FI direct transmission channel basically meets channel requirements of the network access data packet.

After the watch 200 determines the transmission channel, the watch 200 and the mobile phone 100 may enable the WI-FI direct transmission channel to transmit the network access data packet, and after the transmission is completed, disable the WI-FI direct transmission channel.

In this disclosure, when the transmission channel corresponding to the network access data packet is determined, the characteristic of the network access data packet may be directly matched with a characteristic of the transmission channel, or the characteristic of the network access data packet may be quantized to obtain a quantized data packet characteristic, and then the quantized data packet characteristic is compared with a quantized channel characteristic, so as to determine the transmission channel corresponding to the network access data packet. For example, if the characteristic of the network access data packet is that a power consumption requirement characteristic is 2 and a bandwidth requirement characteristic is 1, the corresponding transmission channel is a BLUETOOTH transmission channel, or if a data characteristic of the network access data packet is that a power consumption requirement characteristic is 2 and a bandwidth requirement characteristic is 9, the corresponding transmission channel is a WI-FI direct transmission channel. Alternatively, determining may be directly performed based on a correspondence between the characteristic of the network access data packet and the transmission channel. The transmission channel can be conveniently selected.

When the watch 200 and the mobile phone 100 access a network, there is a case in which network access traffic is concurrently transmitted through a plurality of channels between the watch 200 and the mobile phone 100. That is, there are a plurality of network access data packets between the watch 200 and the mobile phone 100 at the same time. In a scenario in which network access traffic is concurrently transmitted through the plurality of channels, when there is a network access data packet, each transmission channel may be enabled as required for transmission, and the transmission channels are independent of each other and do not affect each other. Because the transmission channels between the watch 200 and the mobile phone 100 are independent of each other and do not affect each other, different network access data packets may be transmitted by using different transmission channels.

In an implementation of this disclosure, when the watch 200 and the mobile phone 100 have two network access data packets: a first network access request data packet and a second network access request data packet, for example, at a moment, a user uses the watch 200 to view weather and uses the watch 200 to download an offline map data packet for navigation, a weather application sends the first network access request data packet, and a map application sends the second network access request data packet. Refer to FIG. 4D and FIG. 4E. A transmission process of the first network access request data packet may be shown in steps S201 to

Figure 6A:
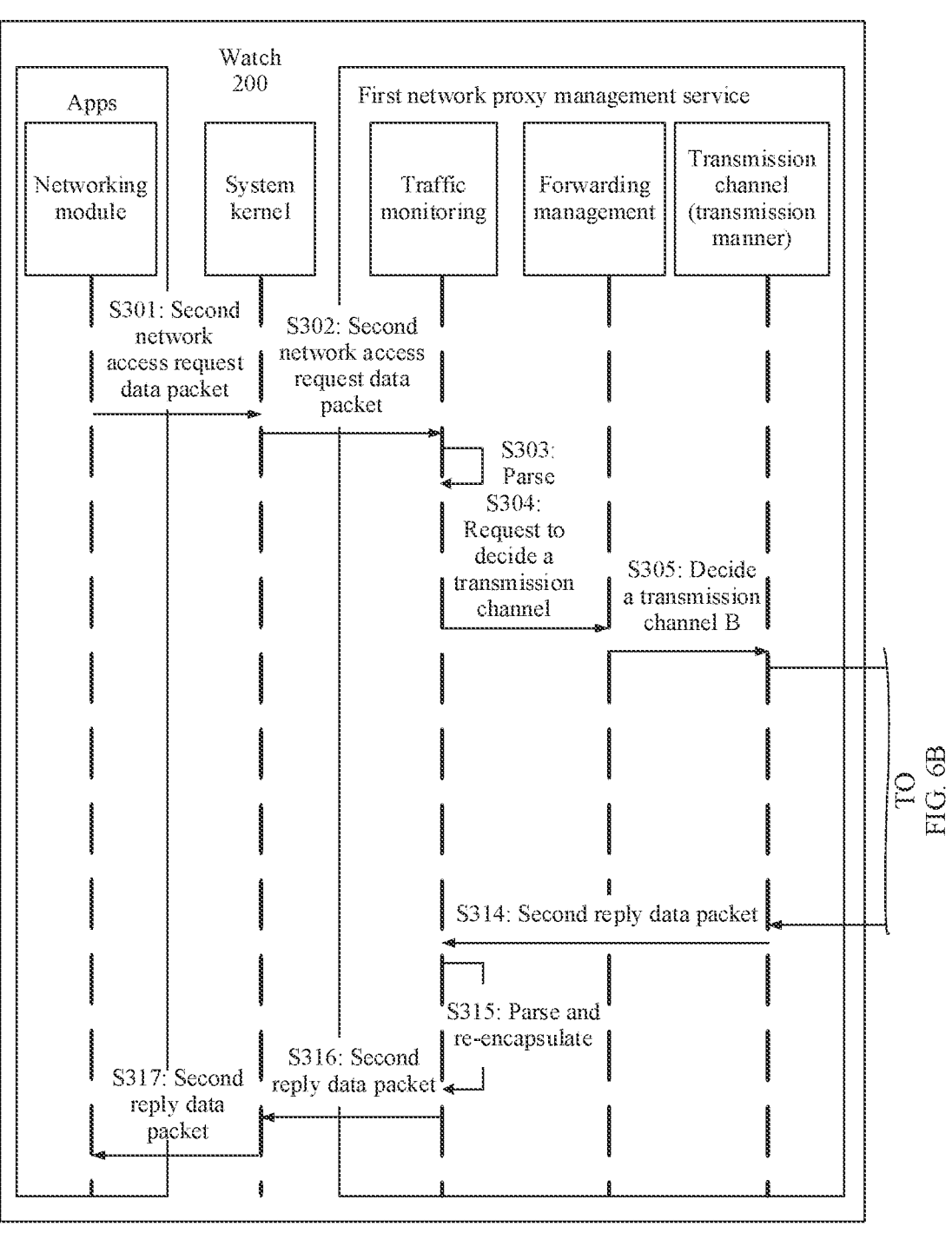
FIG. 6A and FIG. 6B are a schematic diagram of a proxy networking (surfing) process between another mobile phone and watch according to some implementations of this disclosure.
Figure 6B:
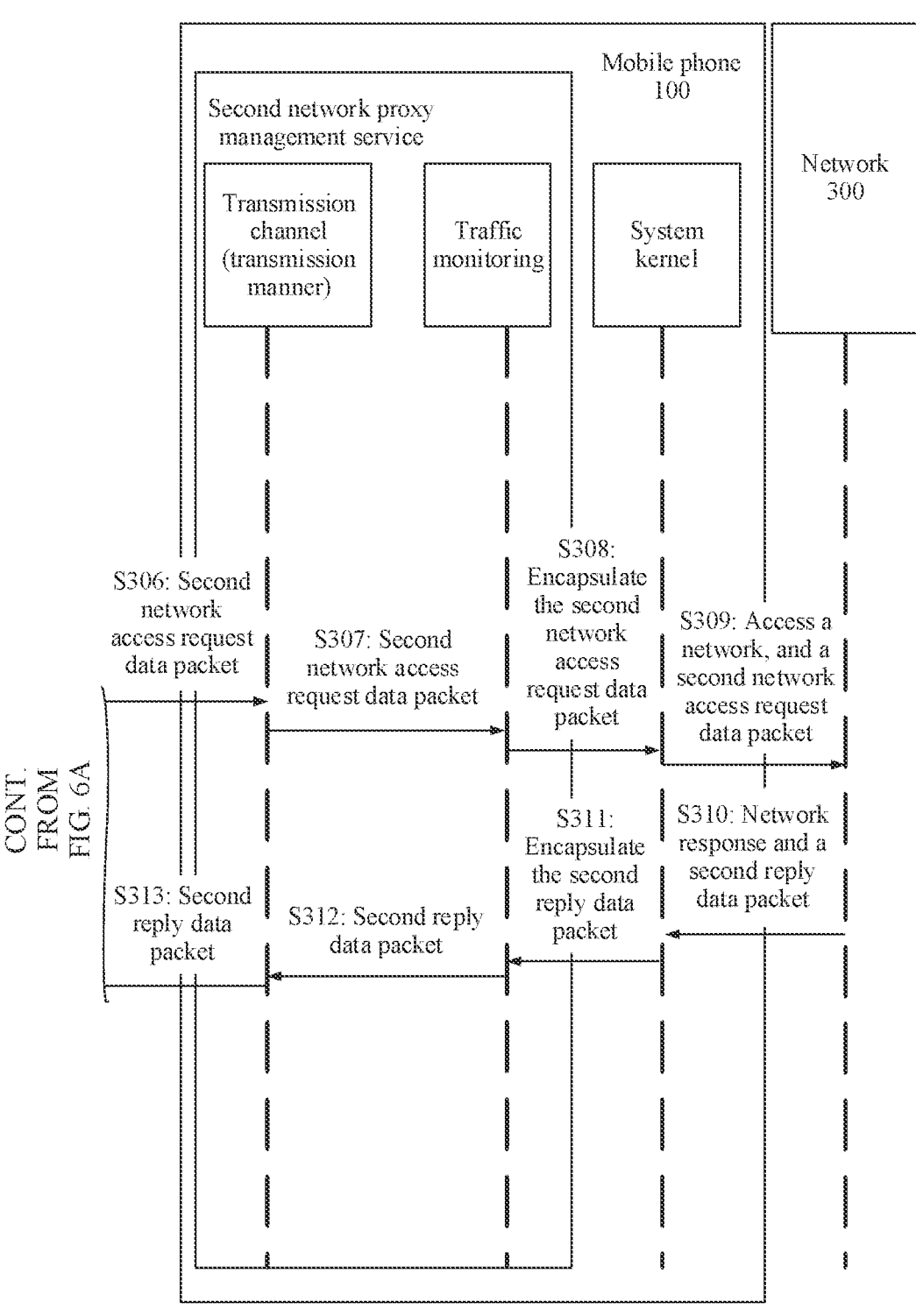

217. In addition, refer to FIG. 6A and FIG. 6B. A transmission process of the second network access request data packet may be shown in steps S301 to 317. The first network access request data packet and the second network access request data packet may be transmitted simultaneously. The first network access request data packet is transmitted through a transmission channel A (that is, a BLUETOOTH transmission channel), and the second network access request data packet is transmitted through a transmission channel B (that is, a WI-FI direct transmission channel).

In addition, the first network access request data packet and the second network access request data packet may be network access request data packets of two different system applications in the watch 200, or may be network access request data packets of one system application in the watch 200.

Further, a process of sending the second network access request data packet and receiving a second reply data packet corresponding to the second network access request data packet is shown in steps S301 to 317. For step S305, a forwarding management module determines that a transmission channel is the transmission channel B, and data is transmitted between the watch 200 and the mobile phone 100 by using the transmission channel B. Other steps respectively correspond to the steps in S201 to 217, and details are not described herein again.

In this implementation, a transmission process of the first network access request data packet and a transmission process of the second network access request data packet are independent of each other, and enabling and disabling of the transmission channel A and the transmission channel B are also independent. Therefore, an objective of transmitting different network access data packets by using transmission channels corresponding to the network access data packets may be implemented.

According to the networking method provided in this disclosure, after two devices such as the mobile phone 100 and the watch 200 are paired, the mobile phone 100 and the watch 200 may pre-negotiate to determine a plurality of data transmission channels of various types in a local area network, and specify a characteristic of each type of transmission channel. The pre-negotiated transmission channel is used for a transmission channel decision algorithm used for subsequent data transmission. That is, in the networking method provided in this disclosure, a plurality of transmission channels used for proxy network access are provided, and network access data packets may be forwarded between devices by using the plurality of transmission channels to resolve a single transmission channel problem in an existing proxy network access solution. In addition, the mobile phone 100 and the watch 200 may determine, based on the transmission channel decision algorithm, the characteristic of the transmission channel and the characteristic of the network access data packet, a transmission channel to be used to transmit the network access data packet by using the transmission channel decision algorithm. In other words, the mobile phone 100 and the watch 200 may automatically identify and select a transmission channel that enables the network access data packet, to provide better network access experience for a user.

In addition, the mobile phone 100 and the watch 200 may select a transmission channel as a default transmission channel, and other transmission channels are enabled and disabled based on a data packet transmission requirement. Therefore, power consumption can be effectively reduced on the basis of meeting the data packet transmission requirement.

Further, in this disclosure, in a process of negotiating and selecting a transmission channel between the mobile phone 100 and the watch 200, a user may not be notified of a transmission channel used between the mobile phone 100 and the watch 200, so that the user is unaware of negotiation, determining, and the like of the transmission channel, and normal networking can be ensured, to improve user experience.

Certainly, in the process of negotiating and selecting the transmission channel between the mobile phone 100 and the watch 200, transmission channel reminder information may be generated to remind the user of a transmission channel currently supported between the mobile phone 100 and the watch 200, and remind the user of use of the current transmission channel, so that the user is clearer of a current network status.

Figure 7:
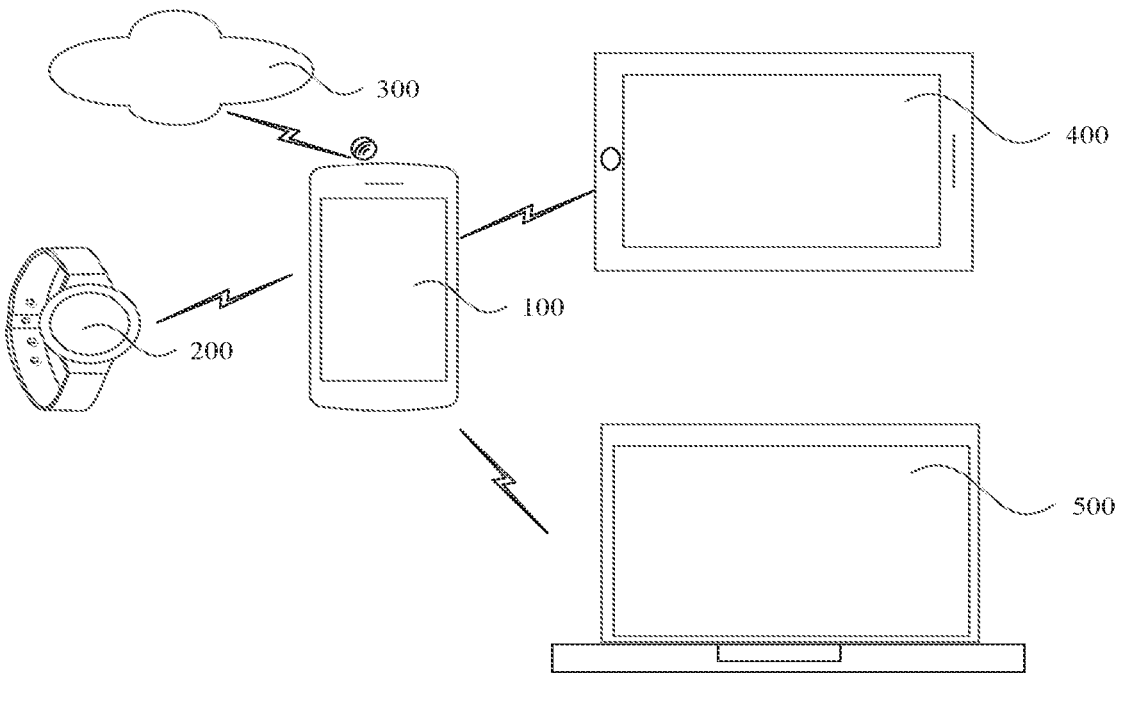
FIG. 7 is a schematic diagram of another networking system according to some implementations of this disclosure.

FIG. 7 shows another networking system according to this disclosure. The networking system includes a mobile phone 100, a watch 200, a network 300, a tablet computer 400, and a PC 500. The networking method provided in this disclosure may be applied to the networking system shown in FIG. 7. The mobile phone 100 is used as a server and can directly access the network 300. The watch 200, the tablet computer 400, and the PC 500 are used as clients and need to access the network 300 by using the mobile phone 100. In addition, two transmission channels: a BLUETOOTH transmission channel and a BLUETOOTH low energy transmission channel are supported between the mobile phone 100 and the watch 200, two transmission channels: a BLUETOOTH transmission channel and a WI-FI Direct transmission channel are supported between the mobile phone 100 and the tablet computer 400, and two transmission channels: a BLUETOOTH transmission channel and a WI-FI direct transmission channel are supported between the mobile phone 100 and the PC 500. It should be noted that, none of the watch 200, the tablet computer 400, and the PC 500 has a cellular network modem, that is, does not have a capability of implementing networking based on a cellular network, and cannot implement autonomous networking in a scenario without a WI-FI network.

In a process in which the watch 200, the tablet computer 400, and the PC 500 access the network 300 by using the mobile phone 100, the mobile phone 100, the watch 200, the tablet computer 400, and the PC 500 respectively determine and select a transmission channel used to transmit network access data between the mobile phone 100, the watch 200, the tablet computer 400, and the PC 500, so as to transmit the network access data.

In addition, the watch 200 may be another wearable device such as a headset, glasses, or a band, or any other device that needs to implement network access by using another device. The mobile phone 100 may be further configured to perform networking on a home device such as a television that is not accessed to a WI-FI network. In addition, the mobile phone 100 may be any other device that can provide a network access service.

Embodiments of the mechanism disclosed in this disclosure may be implemented in a manner such as software, hardware, firmware, or a combination of these implementation methods. Embodiments of this disclosure may be implemented as a computer program or program code executed on a programmable system. The programmable program includes at least one processor and a memory (or a storage system, including volatile and non-volatile memories and/or a storage unit).

It should be noted that the terms "first", "second", and the like are merely used for distinction and descriptions, but cannot be understood as indicating or implying relative importance.

What is claimed is:

1. A networking method implemented by a first electronic device, wherein the networking method comprises:
    establishing a communication connection to a second electronic device;
    determining at least two different types of transmission channels between the first electronic device and the second electronic device, wherein the transmission channels comprise at least two of a BLUETOOTH Low Energy transmission channel, a BLUETOOTH transmission channel, a WI-FI direct transmission channel, a Universal Serial Bus (USB) direct transmission channel, and an Ethernet data line direct transmission channel;
    determining to-be-transmitted first network access data;
    determining a data characteristic of the to-be-transmitted first network access data;
    determining, based on the data characteristic, a first transmission channel of the transmission channels and for sending the to-be-transmitted first network access data; and
    sending the to-be-transmitted first network access data to the second electronic device through the first transmission channel,
    wherein the networking method further comprises:
        selecting one transmission channel from the transmission channels as a default transmission channel that maintains an enabled state;
        when the first transmission channel is the same as the default transmission channel, setting the default transmission channel as the first transmission channel; or
        when the first transmission channel is different from the default transmission channel:
            enabling the first transmission channel for transmission of the to-be-transmitted first network access data; and
            disabling the first transmission channel after the transmission is completed.

2. The networking method of claim 1, further comprising generating a network access request, wherein the to-be-transmitted first network access data comprises the network access request.

3. The networking method of claim 2, wherein the first electronic device is a wearable device, and wherein the second electronic device is a mobile phone.

4. The networking method of claim 1, further comprising receiving first data from a network in response to a network access request of the second electronic device, wherein the to-be-transmitted first network access data comprises the first data.

5. The networking method of claim 4, wherein the first electronic device is a mobile phone, and wherein the second electronic device is a wearable device.

6. The networking method of claim 1, further comprising further determining, based on a preset correspondence between the data characteristic and the first transmission channel, the first transmission channel of the transmission channels and for sending the to-be-transmitted first network access data.

7. The networking method of claim 1, further comprising:
    determining a channel characteristic of each of the transmission channels;

determining a channel requirement of the to-be-transmitted first network access data for each of the transmission channels based on the data characteristic;

matching the channel requirement with the channel characteristic to obtain a matching degree; and further determining, based on the matching degree, the first transmission channel to transmit the to-be-transmitted first network access data.

8. The networking method of claim 7, further comprising:

quantizing the channel characteristic to obtain a corresponding first characteristic value;

quantizing the channel requirement to obtain a corresponding second characteristic value;

obtaining an absolute value of a difference between the corresponding first characteristic value and the corresponding second characteristic value; and further determining the first transmission channel based on the absolute value.

9. The networking method of claim 8, further comprising matching the channel requirement with the channel characteristic to determine a second transmission channel corresponding to a smallest absolute value as the first transmission channel.

10. The networking method of claim 7, wherein:

the channel characteristic comprises at least one of: a power consumption characteristic; a bandwidth characteristic; a channel response speed characteristic; a transmission delay characteristic; or a connection reliability characteristic, the channel requirement comprises at least one of: a power consumption requirement; a bandwidth requirement; a channel response speed requirement; a transmission delay requirement; or a connection reliability requirement, and wherein the channel characteristic and the channel requirement correspond to each other.

11. The networking method of claim 1, wherein the data characteristic comprises at least one of:

a transmission protocol type;

a data frame size; or quintuple information.

12. The networking method of claim 11, wherein the first transmission channel is:

a BLUETOOTH transmission channel when a transmission protocol type of the to-be-transmitted first network access data is a Domain Name System (DNS) protocol or a Hypertext Transfer Protocol; and the WI-FI direct transmission channel when a transfer protocol type of the to-be-transmitted first network access data is a File Transfer Protocol or a Real-Time Transfer Protocol.

13. The networking method of claim 11, wherein the first transmission channel is:

the WI-FI direct transmission channel when a data frame size of the to-be-transmitted first network access data is greater than or equal to a preset data frame threshold; and a BLUETOOTH transmission channel when the data frame size is less than the preset data frame threshold.

14. The networking method of claim 11, further comprising determining, based on quintuple information of the to-be-transmitted first network access data, a service type corresponding to the to-be-transmitted first network access data, wherein the first transmission channel is the WI-FI direct transmission channel when the service type is a streaming media service or a Domain Name System (DNS) protocol service.

15. The networking method of claim 1, further comprising:

sending channel information of the first transmission channel to the second electronic device through the default transmission channel; and when the first transmission channel is different from the default transmission channel:

sending, to the second electronic device through the default transmission channel, first information for enabling the first transmission channel after determining the first transmission channel; and sending, to the second electronic device through the default transmission channel, second information for disabling the first transmission channel after the to-be-transmitted first network access data is sent.

16. The networking method of claim 1, further comprising:

displaying a declaration and a consent control for enabling a proxy networking multi-transmission channel negotiation function when the first electronic device and the second electronic device are paired to establish the communication connection;

detecting a trigger operation of a user on the consent control; and in response to detecting the trigger operation:

determining a second transmission channel; and determining, in a process of transmitting network access data to the second electronic device, the first transmission channel for transmission of the to-be-transmitted first network access data.

17. The networking method of claim 1, further comprising:

displaying a proxy networking multi-transmission channel negotiation and selection control of the first electronic device when the first electronic device and the second electronic device are paired to establish the communication connection;

detecting an enabling operation of a user on the proxy networking multi-transmission channel negotiation and selection control; and in response to detecting the enabling operation:

determining a second transmission channel; and determining, in a process of transmitting network access data to the second electronic device, the first transmission channel for transmission of the to-be-transmitted first network access data.

18. A networking method comprising:

establishing, by a first electronic device, a communication connection to a second electronic device;

determining, by the first electronic device, at least two different types of transmission channels between the first electronic device and the second electronic device, wherein the transmission channels comprise at least two of a BLUETOOTH Low Energy transmission channel, a BLUETOOTH transmission channel, a WI-FI direct transmission channel, a universal serial bus direct transmission channel, and an Ethernet data line direct transmission channel;

generating, by the first electronic device, to-be-transmitted first network access data;

determining, by the first electronic device, a first data characteristic of the to-be-transmitted first network access data;

determining, by the first electronic device based on the first data characteristic, a first transmission channel that is in the transmission channels and that transmits the to-be-transmitted first network access data;

sending, by the first electronic device, the to-be-transmitted first network access data to the second electronic device through the first transmission channel, wherein the networking method further comprises:

selecting, by the first electronic device, one transmission channel from the transmission channels as a default transmission channel that maintains an enabled state;

when the first transmission channel is the same as the default transmission channel, setting, by the first electronic device, the default transmission channel as the first transmission channel; or when the first transmission channel is different from the default transmission channel:

enabling, by the first electronic device, the first transmission channel for transmission of the to-be-transmitted first network access data; and disabling, by the first electronic device, the first transmission channel after the transmission is completed, and wherein the networking method further comprises:

receiving, by the second electronic device, the to-be-transmitted first network access data;

sending, by the second electronic device, the to-be-transmitted first network access data to a network;

receiving, by the second electronic device, second network access data from the network in response to the to-be-transmitted first network access data; and either:

sending, by the second electronic device, the second network access data to the first electronic device through the first transmission channel; or determining, by the second electronic device, a second data characteristic of the second network access data and a second transmission channel to transmit the second network access data based on the second data characteristic and sending, by the second electronic device, the second network access data to the first electronic device through the second transmission channel.

19. A first electronic device comprising:

a memory configured to store instructions; and a processor coupled to the memory and configured to execute the instructions to cause the first electronic device to:

establish a communication connection to a second electronic device;

determine at least two different types of transmission channels between the first electronic device and the second electronic device, wherein the transmission channels comprise at least two of a BLUETOOTH Low Energy transmission channel, a BLUETOOTH transmission channel, a WI-FI direct transmission channel, a universal serial bus direct transmission channel, and an Ethernet data line direct transmission channel;

determine to-be-transmitted first network access data;

determine a data characteristic of the to-be-transmitted first network access data;

determine, based on the data characteristic, a first transmission channel of the transmission channels and for sending the to-be-transmitted first network access data; and send the to-be-transmitted first network access data to the second electronic device through the first transmission channel, wherein the processor is further configured to execute the instructions to further cause the first electronic device to:

select one transmission channel from the transmission channels as a default transmission channel that maintains an enabled state;

when the first transmission channel is the same as the default transmission channel, set the default transmission channel as the first transmission channel; or when the first transmission channel is different from the default transmission channel:

enable the first transmission channel for transmission of the to-be-transmitted first network access data; and disable the first transmission channel after the transmission is completed.

20. The first electronic device of claim 19, wherein the processor is further configured to execute the instructions to further cause the first electronic device to generate a network access request, wherein the to-be-transmitted first network access data comprises the network access request.

* * * * *